US012767503B2

(12) United States Patent
Politte et al.

(10) Patent No.: US 12,767,503 B2
(45) Date of Patent: Oct. 20, 2026

(54) HYDRAULIC JACK HAVING A DC POWER SUPPLY

(71) Applicant: TECHTRONIC CORDLESS GP, Anderson, SC (US)

(72) Inventors: Benjamin G. Politte, Greenville, SC (US); Alyssa T. Gaull, Greenville, SC (US); Shane A. Wood, Easley, SC (US); Carl N. Chandler, Greenville, SC (US); Frederick B. Hidle, Shelby, NC (US); Joshua P. Colllins, Easley, SC (US); Michael K. Saporsky, Greenville, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 343 days.

(21) Appl. No.: 18/486,997

(22) Filed: Oct. 13, 2023

(65) Prior Publication Data

US 2024/0124281 A1 Apr. 18, 2024

Related U.S. Application Data

(60) Provisional application No. 63/379,417, filed on Oct. 13, 2022.

(51) Int. Cl.
*B66F 3/44* (2006.01)
*B66F 3/28* (2006.01)

(52) U.S. Cl.
CPC .................. *B66F 3/44* (2013.01); *B66F 3/28* (2013.01); *B66F 2700/05* (2013.01)

(58) Field of Classification Search
CPC ...... B66F 3/36; B66F 3/28; B66F 3/44; B66F 2700/05
See application file for complete search history.

(56) References Cited

U.S. PATENT DOCUMENTS 3,918,683 A * 11/1975 Millar ........................ B66F 3/24 206/349
4,598,898 A 7/1986 Hsu et al.
(Continued)

FOREIGN PATENT DOCUMENTS

CN 2116001 U 9/1992
CN 2182171 Y 11/1994
(Continued)

OTHER PUBLICATIONS

ABN, "ABN 3 Ton Electric Hydraulic Jack—Automatic Emergency Lift for All Cars, Vans, Trucks, SUVs," <https://www.amazon.com/gp/product/B01N7Y678W/ref=ppx_yo_dt_b_asin_title_000_s00?ie=UTF8&psc=1> web page visited Oct. 23, 2023 (11 pages).
(Continued)

*Primary Examiner* — Seahee Hong
(74) *Attorney, Agent, or Firm* — Michael Best & Friedrich LLP

(57) ABSTRACT

The present disclosure is a hydraulic jack including a housing that supports a reservoir, a motor, a pump assembly, and a lift assembly. The housing includes a lift portion in which the lift assembly is at least partially supported, and a power supply portion configured to removably receive a power supply. The motor is configured to receive power from the power supply. The pump assembly receives a rotational output from the motor to generate a flow of hydraulic fluid from the reservoir. The lift assembly is extendable between a retracted position and an extended position in response to the flow of hydraulic fluid and is configured as a three-stage lift assembly with a first stage that extendable in a first manner, and second and third stages extendable in a second manner.

20 Claims, 17 Drawing Sheets

(56) References Cited

U.S. PATENT DOCUMENTS

| | | | | |
|---|---|---|---|---|
| 4,667,932 | A * | 5/1987 | Arbeloa | B66F 3/42 254/93 A |
| 5,522,583 | A | 6/1996 | Martin | |
| 5,639,065 | A | 6/1997 | Lin | |
| 6,468,049 | B1 * | 10/2002 | Hung | F04B 15/023 417/415 |
| 6,877,200 | B2 | 4/2005 | Villarreal | |
| 7,207,548 | B1 | 4/2007 | Howe | |
| 7,309,140 | B2 | 12/2007 | Huang | |
| 7,401,764 | B1 * | 7/2008 | Castillo | B66F 5/04 254/93 H |
| 7,588,341 | B2 | 9/2009 | Lin | |
| 8,118,279 | B2 | 2/2012 | Lin | |
| 8,366,074 | B2 | 2/2013 | Lin | |
| 8,500,095 | B1 * | 8/2013 | Salcedo | B66F 5/025 254/93 H |
| 9,010,730 | B2 | 4/2015 | Zhong et al. | |
| 9,193,572 | B2 | 11/2015 | Finkbeiner et al. | |
| 9,340,397 | B1 | 5/2016 | Hernandez | |
| 9,855,929 | B2 | 1/2018 | Bennett | |
| 10,000,189 | B2 | 6/2018 | Zimmerman | |
| 10,513,423 | B2 | 12/2019 | Desormeau et al. | |
| D873,522 | S | 1/2020 | Jin | |
| 10,640,094 | B2 | 5/2020 | Zimmerman | |
| 11,332,350 | B2 | 5/2022 | Desormeau et al. | |
| 11,434,116 | B2 | 9/2022 | Resendiz | |
| 11,479,450 | B2 | 10/2022 | Desormeau et al. | |
| 11,511,979 | B2 | 11/2022 | Zimmerman | |
| 11,591,193 | B2 | 2/2023 | Desormeau et al. | |
| 11,634,307 | B2 | 4/2023 | Edwards, Sr. | |
| 11,731,867 | B2 | 8/2023 | Smith et al. | |
| 12,351,438 | B2 * | 7/2025 | Moen | B66F 3/35 |
| 2003/0043581 | A1 | 3/2003 | Finnigan | |
| 2008/0022462 | A1 | 1/2008 | Benson | |
| 2015/0137052 | A1 * | 5/2015 | DeKeuster | B66F 13/00 254/133 R |
| 2019/0002258 | A1 | 1/2019 | Zhou et al. | |
| 2020/0269641 | A1 | 8/2020 | Edwards, Sr. | |

FOREIGN PATENT DOCUMENTS

| | | | |
|---|---|---|---|
| CN | 2206280 | Y | 8/1995 |
| CN | 2334740 | Y | 8/1999 |
| CN | 2396021 | Y * | 9/2000 |
| CN | 2495632 | Y | 6/2002 |
| CN | 2555265 | Y | 6/2003 |
| CN | 2702985 | Y | 6/2005 |
| CN | 1241820 | C | 2/2006 |
| CN | 2759988 | Y | 2/2006 |
| CN | 2799507 | Y | 7/2006 |
| CN | 201209102 | Y | 3/2009 |
| CN | 201214616 | Y | 4/2009 |
| CN | 101565156 | A | 10/2009 |
| CN | 201704016 | U | 1/2011 |
| CN | 203128110 | U | 8/2013 |
| CN | 203568768 | U | 4/2014 |
| CN | 203740953 | U | 7/2014 |
| CN | 204237499 | U | 4/2015 |
| CN | 204281182 | U | 4/2015 |
| CN | 204490409 | U | 7/2015 |
| CN | 205773050 | U | 12/2016 |
| CN | 206156665 | U | 5/2017 |
| CN | 206336974 | U | 7/2017 |
| CN | 207451508 | U | 6/2018 |
| CN | 108466965 | A | 8/2018 |
| CN | 109384166 | A | 2/2019 |
| CN | 109384167 | A | 2/2019 |
| CN | 209038954 | U | 6/2019 |
| CN | 305341537 | S | 9/2019 |
| CN | 209685215 | U | 11/2019 |
| CN | 111196576 | A | 5/2020 |
| CN | 111891963 | A | 11/2020 |
| CN | 211971620 | U | 11/2020 |
| CN | 213976778 | U | 8/2021 |
| CN | 114560414 | A | 5/2022 |
| CN | 114644299 | A | 6/2022 |
| CN | 216836925 | U | 6/2022 |
| CN | 217496086 | U | 9/2022 |
| CN | 116573566 | A | 8/2023 |
| CN | 116653865 | A | 8/2023 |
| DE | 8806335 | U1 | 7/1988 |
| DE | 9111770 | U1 | 4/1992 |
| EP | 0341579 | A2 | 11/1989 |
| EP | 0532970 | A1 | 3/1993 |
| GB | 2084092 | A | 4/1982 |
| WO | WO2021142557 | A1 | 7/2021 |
| WO | WO2023018993 | A1 | 2/2023 |

OTHER PUBLICATIONS

Greenworks, "24V Cordless Battery Car Jack w/ 2.0 Ah Battery & Charger," <https://www.greenworkstools.com/products/24v-cordless-battery-car-jack-w-2ah-battery-and- charger?variant=44637837230240&currency=USD&utm_medium=product_sync&utm_source=google&utm_content=sag_organic&utm_campaign=sag_organic&utm_source=Google%20Ads&utm_medium=Shopping&utm_campaign=15990624702&utm_content=&device=c&j_source=Google%20Ads&j_medium=Shopping&j_campaign=15990624702&j_content=&gclid=Cj0KCQjwtO-kBhDIARIsAL6LoreVH6tB32ZAmVyjub7_xs00h6Q3w3b3DvPNbNUT759vBcZIWIkclx0aAicqEALw_wcB> web page visited Oct. 23, 2023 (3 pages).

* cited by examiner

HYDRAULIC JACK HAVING A DC POWER SUPPLY

RELATED APPLICATIONS

This application claims priority to U.S. Provisional Patent Application No. 63/379,417, filed on Oct. 13, 2022, the entire content of which is incorporated herein by reference.

TECHNICAL FIELD

The present disclosure relates to a hydraulic jack, and more particularly to a hydraulic jack having a direct current (DC) power supply.

BACKGROUND

Service of passenger vehicle components often requires use of a jack to raise the vehicle to a height at which the tire is no longer in contact with the ground, for instance, when the vehicle experiences a flat tire during a drive. To temporarily replace the punctured tire with a spare tire to allow the driver to drive the vehicle to a service shop for repair of the tire, the vehicle must be raised by a jack. Many vehicles include a screw-type mechanical scissor jack as a factory-installed equipment, however, the jacking operation using a mechanical scissor jack is both time consuming and physically demanding. Other aftermarket jacks may include a motor to ease the physical demand of use of a mechanical jack, but these motorized jacks often lack portability.

SUMMARY

According to one or more embodiments, the present subject matter provides, in one aspect, a hydraulic jack including a housing having a lift portion and a power supply portion configured to removably receive a power supply, a reservoir supported in the housing in which hydraulic fluid is stored, a motor supported in the housing and receiving power from the power supply, a pump assembly configured to receive a rotational output from the motor and generate a flow of hydraulic fluid from the reservoir, and a lift assembly supported in the lift portion and extendable between a retracted position and an extended position in response to the flow of hydraulic fluid.

According to one or more embodiments, the present subject matter provides in another aspect, a hydraulic jack including a lift assembly that is a three-stage telescoping piston assembly in which the first stage is extendable in a first manner and the second and third stages are extendable in a second manner.

According to one or more embodiments, the present subject matter provides in another aspect, a hydraulic jack having a tray comprising a magnetic material.

According to one or more embodiments, the present subject matter provides in another aspect, a hydraulic jack with a battery pack mount positioned on a front side of the housing.

According to one or more embodiments, the present subject matter provides in another aspect a hydraulic jack with a battery pack mount positioned on an end of the housing, and a center of gravity of the hydraulic jack is in the middle of the housing.

According to one or more embodiments, the present subject matter provides in another aspect, a hydraulic jack having a motor coupled to a hydraulic drive assembly, and a reservoir communicating the hydraulic drive mechanism. Hydraulic fluid stored in the reservoir drives a piston to an extended position.

According to one or more embodiments, the present subject matter provides in another aspect, a light source of a hydraulic jack having LEDs.

According to one or more embodiments, the present subject matter provides in another aspect, a light source having a ring shape.

According to one or more embodiments, the present subject matter provides in another aspect, a hydraulic jack having a control that controls operation of the hydraulic jack that is coupled to the hydraulic jack via a cord.

According to one or more embodiments, the present subject matter provides, in another aspect, a hydraulic jack in which the housing is configured to store the cord wound about the housing.

According to one or more embodiments, the present subject matter provides, in another aspect, a hydraulic jack including a cord having length of about six feet.

According to another embodiment, the present subject matter provides, in another aspect, a control that is wirelessly connected to and controls operation of the hydraulic jack.

According to one or more embodiments, the present subject matter provides, in another aspect, a control for a hydraulic jack including lift controls and a light control.

According to one or more embodiments, the present subject matter provides, in another aspect, a hydraulic jack that has a lift height of 16.5 inches.

According to one or more embodiments, the present subject matter provides, in another aspect, a hydraulic jack that lifts an object to a lift height of 18.5 inches.

According to one or more embodiments, the present subject matter provides, in another aspect, a hydraulic jack configured to store a wrench.

Other aspects of the subject matter will become apparent by consideration of the detailed description and accompanying drawings.

DETAILED DESCRIPTION

Figure 1:
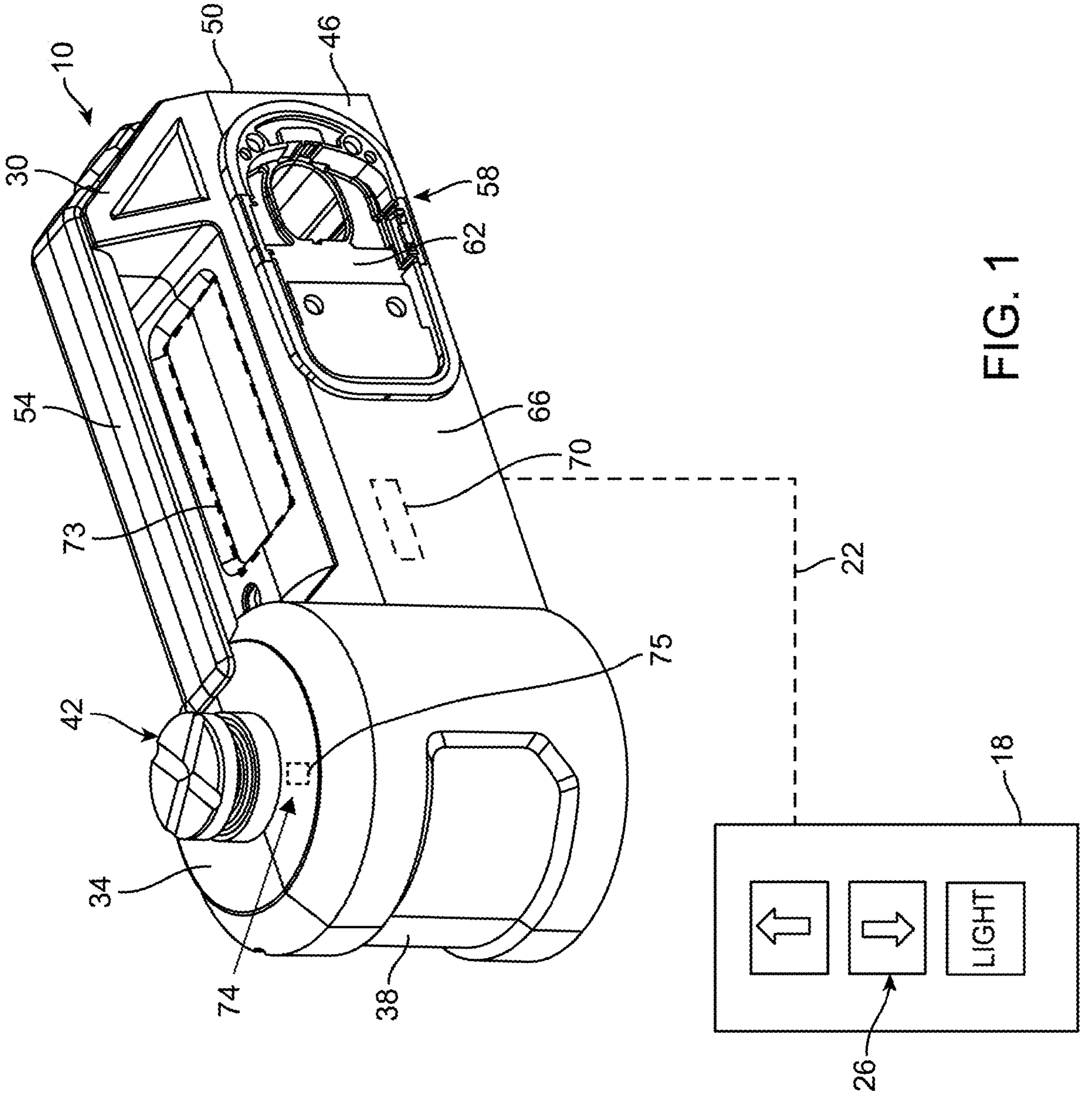
FIG. 1 is a perspective view of an exemplary hydraulic jack according to the present disclosure and including a lift assembly, a power supply mount, and a control coupled to the hydraulic jack.

Before any embodiments of the present subject matter are explained in detail, it is to be understood that the subject matter is not limited in its application to the details of construction and the arrangement of components set forth in the following description or illustrated in the following drawings. The subject matter is capable of other embodiments and of being practiced or of being carried out in various ways.

It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations. To reiterate, the electronic processors and processing may be distributed.

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

It will be apparent that features illustrated or described as part of one embodiment may be used with another embodiment to yield a still further embodiment. Thus, it is intended that the present disclosure covers such modifications and variations as come within the scope of the appended claims and their equivalents. The detailed description uses numerical and letter designation to refer to features of the drawings. Like or similar designations in the drawings and descriptions have been used to refer to like or similar parts of the invention. Features of the drawings having a modification or variation relative the feature of another embodiment are noted with a numeral having one or more prime (') symbols and reference to a feature is to be understood to include references to the modified feature.

Figure 2:
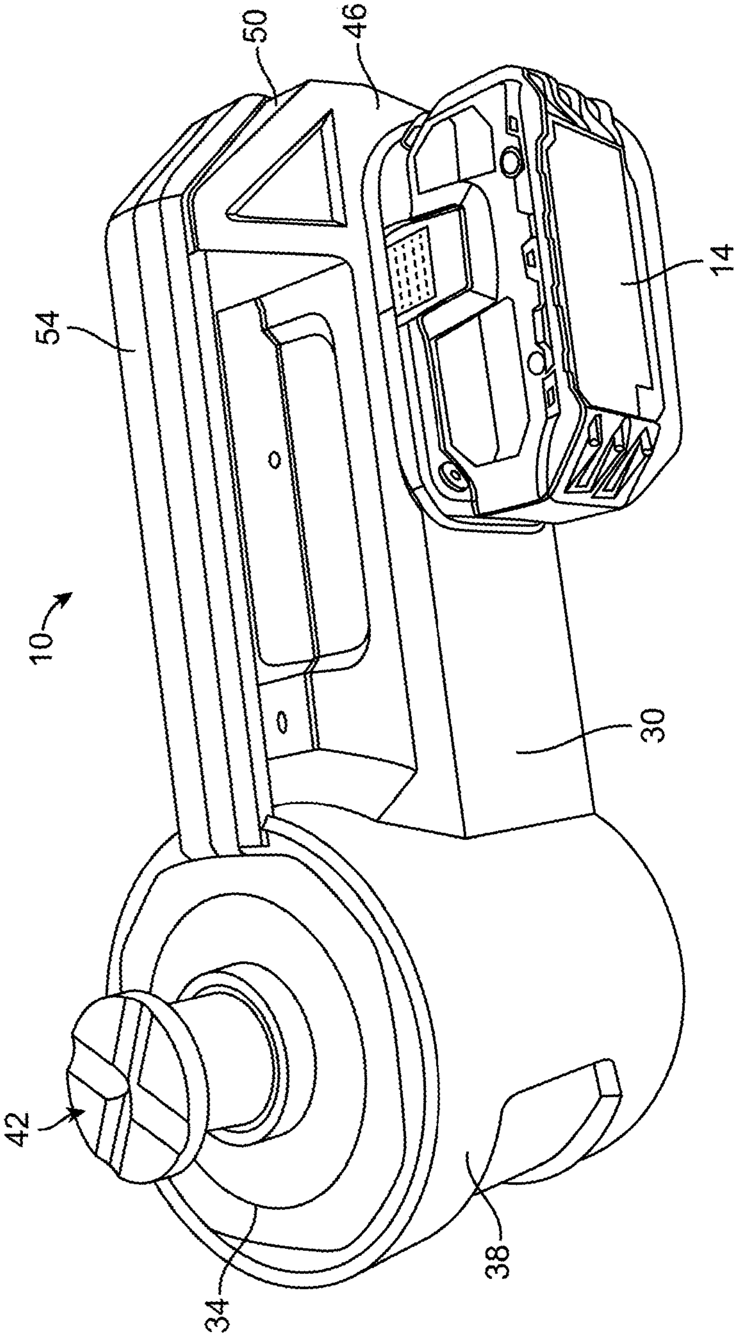
FIG. 2 is another perspective view of the hydraulic jack according to FIG. 1 and including a DC power supply coupled to the power supply mount.

FIGS. 1 and 2 illustrate an exemplary hydraulic jack 10 that may be powered by a direct current ("DC") power supply 14. The DC power supply 14 is illustrated as a tower-style lithium-ion rechargeable battery pack that has an 18*v* capacity, although other styles of battery packs, compositions, and/or capacities may be used. The hydraulic jack 10 may be remotely operable via a control 18 that is communicatively coupled to the hydraulic jack 10. In the embodiment of FIG. 1, the control 18 is coupled by a cord 22 (illustrated schematically). The cord 22 may extend several feet in length. In this way, safety of the hydraulic jack 10 may be improved by allowing the user to stand several feet away from the object to be lifted as the object lifts or lowers. The cord 22 may extend approximately six feet in length, or less than or greater than six feet. In some embodiments, the control 18 wirelessly communicates with and controls operation of the hydraulic jack 10 (e.g., via Bluetooth or other wireless communication). The control 18 includes an operation interface 26 (a position control switch, which may be one or more depressible buttons, a two-position or three-position switch, or other structure engageable by a user) to control operation of the hydraulic jack 10 (e.g., lift operation, light source operation, etc.). In some embodiments, the control 18 may be supported on the jack 10.

With continued reference to FIGS. 1 and 2, the hydraulic jack 10 includes a housing 30 that has a lift portion 34 at a first end 38 that supports a lift assembly 42, a power supply portion 46 at a second end 50, and a handle 54 that extends between the lift portion 34 and the power supply portion 46 of the housing 30. The power supply portion 46 defines a power supply interface 58 that includes a power supply mount 62 that is accessible from a side (e.g., the front side 66) of the housing 30 (e.g., adjacent the second end 50 of the housing 30). The DC power supply 14 is attachable to the power supply interface 58 via the power supply mount 62. In the illustrated embodiment, the power supply mount 62 slidably receives the DC power supply 14 and removably couples the DC power supply 14 to the hydraulic jack 10. It will be appreciated that in the illustrated embodiment, the length of the hydraulic jack 10 is reduced in comparison to embodiments of hydraulic jacks 10', shown in FIGS. 3 and 3A, in which the DC power supply 14 is attached to the second end 50.

It will be appreciated that with the DC power supply 14 coupled to the second end 50 of the hydraulic jack 10', the center of gravity 68 of the hydraulic jack 10' is located closer to or adjacent a center of the jack 10' along the longitudinal axis μl extending between the first end 38 and second end 50 of the housing 30' (e.g., beneath the handle 54') when the DC power supply 14 is coupled to the power supply mount 62. A fuel gauge or battery charge status indicator may be supported on the housing 30' (e.g., on or adjacent the second end 50) so as to be viewable by a user (e.g., pointing upward).

The hydraulic jack 10' includes a system on/off switch 70 (e.g., a power switch) that is supported on the housing 30' and that is configured to activate the hydraulic jack 10' for use (i.e. turn on), and to deactivate the hydraulic jack 10' (i.e. turn off or go to standby mode) when the user has completed a lift operation or when the hydraulic jack 10' is stored or transported. The power switch 70 is variable between an "ON" position and an "OFF" position that define the activated and deactivated states of the hydraulic jack 10', respectively. In the illustrated embodiment, the cord 22 may be windable about the housing 30' and the control 18 removably couplable to, and at least partially nested within a recess 69 of, the housing 30' for storage and portability (e.g. during transportation of the hydraulic jack 10). In some embodiments, the cord 22 may be retractable into the housing 30'. In some aspects, the operation interface 26 (e.g., a remote) may not be activated unless and until the on/off switch 70 is in the "ON" position. In this way, unintentional raising/lowering of the vehicle may be avoided. Stated another way, the hydraulic jack 10 is operable in a two-step operation: the first step includes positioning the on/off switch 70 in the "ON" position, and in a second step, operating the hydraulic jack 10 by engaging (e.g., depressing") the interface 26 of the control 18 to raise/lower the lift assembly 42.

The housing 30' also defines a port 71 that communicates the interior of the housing 30' to provide access to structures within the housing 30' for operation, as will be described in greater detail below. A cover 71*a* may be coupled to the housing 30' for removably covering the port 71 and sealing the interior of the housing 30' to limit ingress of external debris into the interior of the housing 30.

The housing 30' may also provide additional storage for other objects. In the illustrated embodiment, an Allen wrench 72 is couplable to the housing 30' (e.g. below the handle 54' between the lift portion 34 and the power supply portion 46') for use with the hydraulic jack 10' as will be described below.

Returning to FIG. 1, the housing 30 may include or define a tray 73 (illustrated schematically, e.g., adjacent to and below the handle 54). In some embodiments, the tray 73 may be recessed in the housing 30. The tray 73 may include a magnetic material that may magnetically attract a lug nut or other metallic fastener that may be removed from the vehicle or other structure to be lifted to prevent misplacement, or to store a tool for easy access to the tool.

Figure 3:
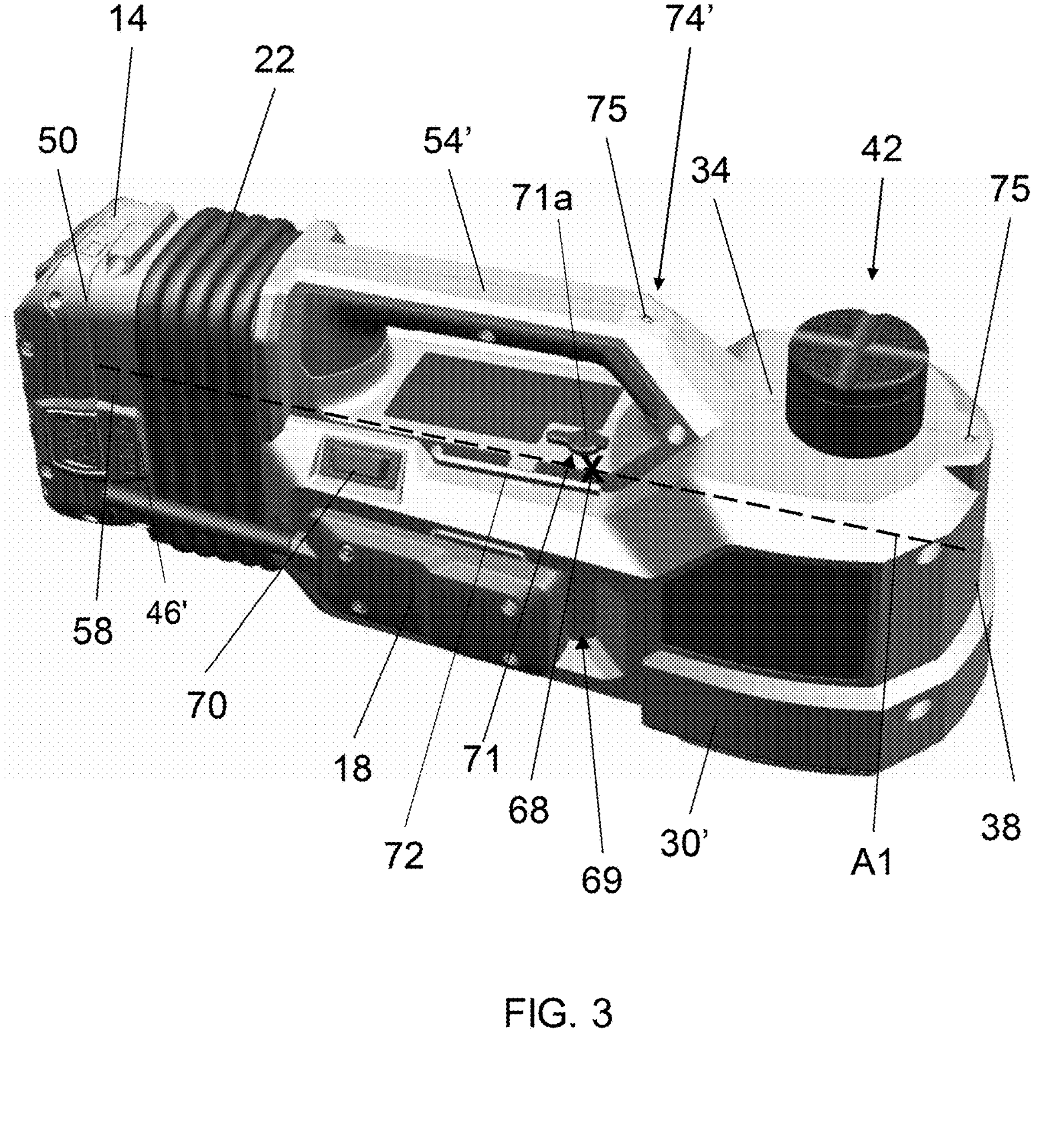
FIG. 3 is a perspective view of another exemplary hydraulic jack according to the present disclosure.
Figure 3A:
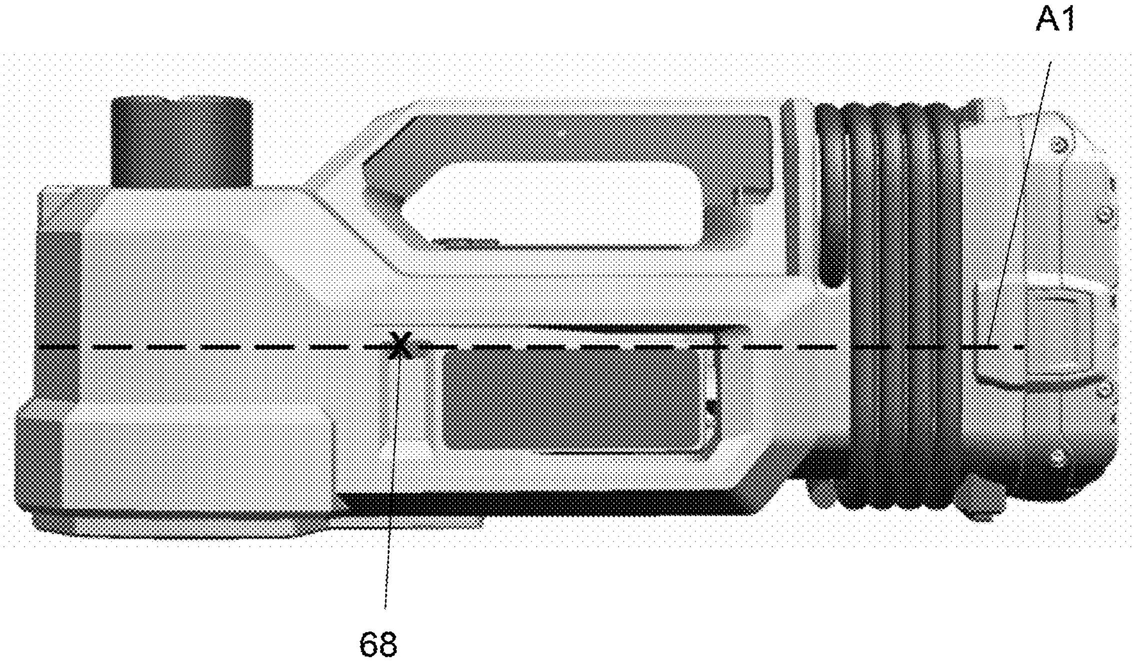
FIG. 3A is a side view of the hydraulic jack according to FIG. 3, illustrating the center of gravity of the hydraulic jack.
Figure 4:
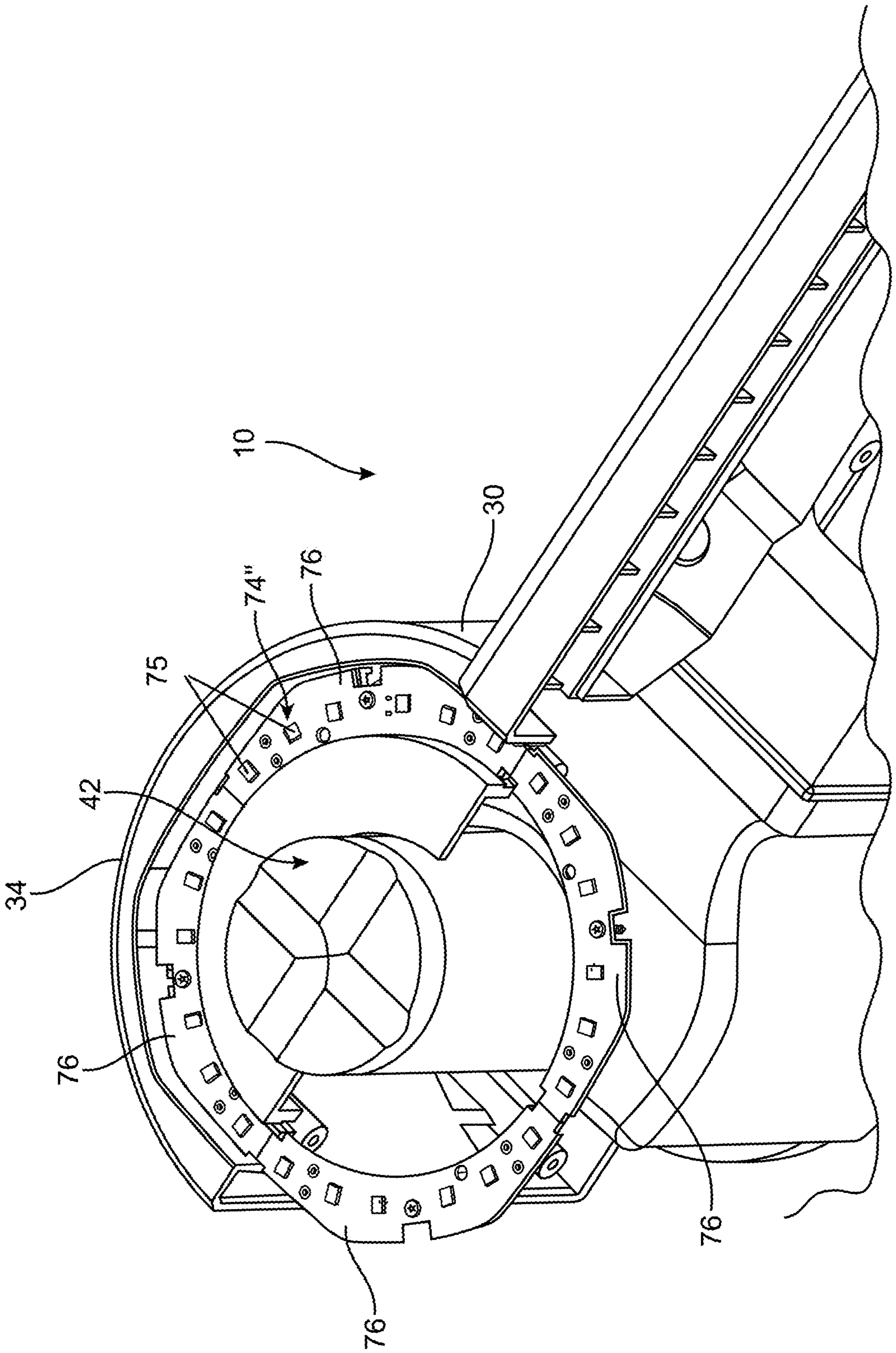
FIG. 4 is a perspective view of a portion of a hydraulic jack including a light source.

The hydraulic jack 10 includes one or more light sources 74 (illustrated schematically) that may be disposed in the lift portion 34 and that activate when the on/off switch 70 is in the "ON" position to illuminate the lift assembly 42, the vehicle or other structure to be lifted by the lift assembly 42, and/or portions thereof. In this way, even when it is dark outside, the user may be able to more clearly see or view that the jack 10 is positioned and contacts the vehicle correctly prior to lifting the object. In some embodiments, the light source 74 is a point light source (e.g., a single light-emitting diode 75 or "LED") that is directed toward the object to be lifted (i.e., upward). With reference to FIG. 3, in another embodiment, the light source 74' includes two LEDs 75 supported by the housing 30' and spaced approximately 180 degrees apart on opposite sides of the lift assembly 42, with one LED disposed or supported in the handle 54' and the other LED disposed or supported at the first end 38 of the housing. With reference to FIG. 4, in yet another embodiment of the light source 74" may have a ring shape comprising one or more (e.g., four) printed circuit boards 76 ("PCBs") arranged end-to-end and supported in the housing 30 (e.g., in a recess). Each of the PCBs 76 supports a plurality of LEDs. The housing 30 may support a lens (not shown) disposed over the light source 74, 74' to diffuse or focus the light emitted by the light source 74'. In other embodiments, the construction of the light may have another arrangement, may include different quantities and location of the LEDs, may have a different shape in which the LEDs are arranged, or may support the LEDs in different ways. It will be appreciated that the point-light source 74 and the ring-shaped light source 74' are only two non-limiting examples of a source of light.

Figure 5:
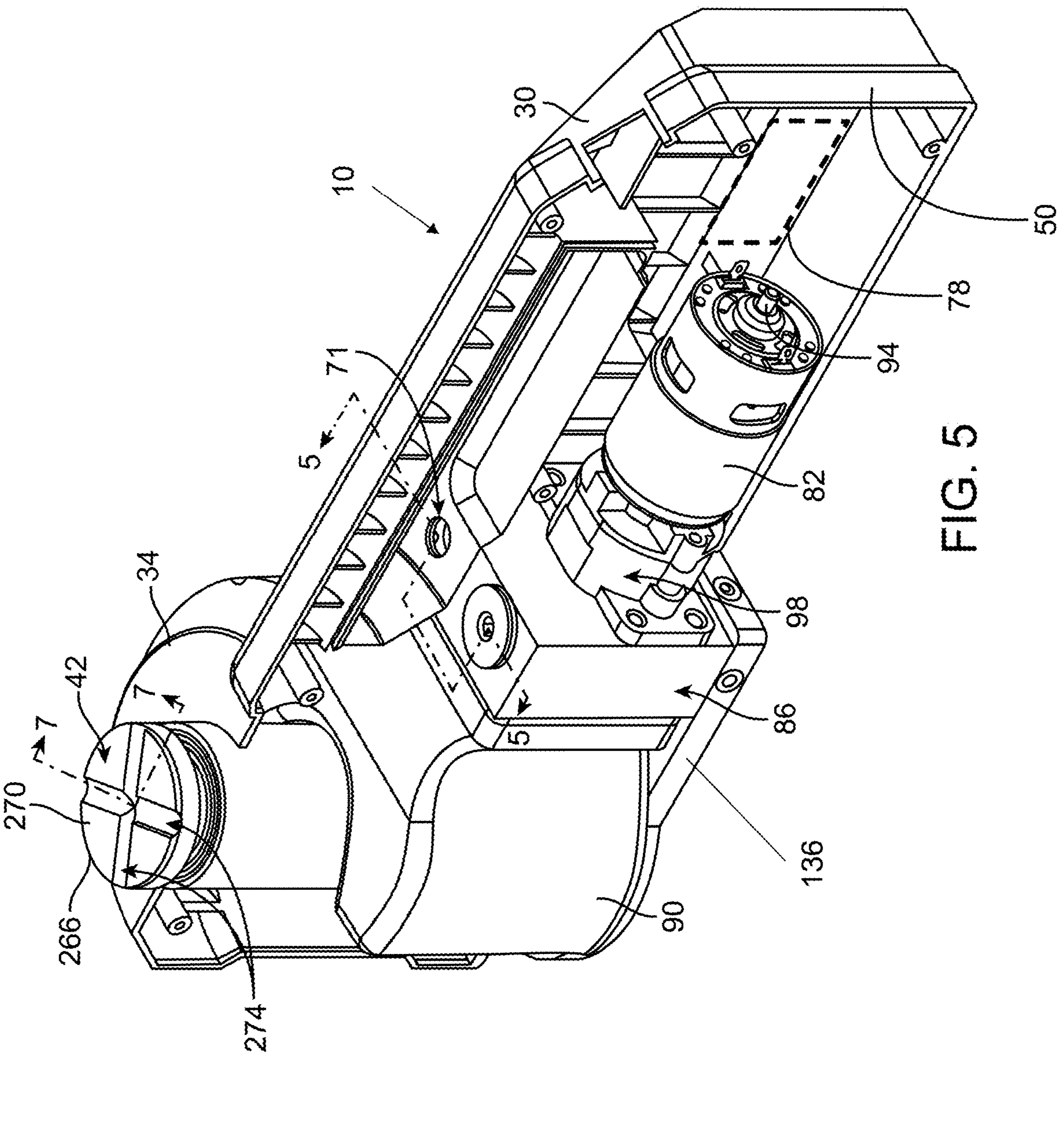
FIG. 5 is a perspective view of the hydraulic jack with a portion of the hydraulic jack removed to illustrate internal components.

With reference to FIG. 5, the housing 30 supports a printed circuit board assembly 78 ("control board," illustrated schematically), a motor 82 (e.g., a brushed DC motor), a hydraulic drive assembly 86, and a reservoir 90 that stores hydraulic fluid. The control board 78 may be supported adjacent to the second end 50 of the housing 30, or in another position within the housing 30. The control board 78, the control 18, the motor 82 and the DC power supply 14 are electrically coupled to each other, and the control board 78 controls power to the motor 82 to activate the motor 82 and optionally perform other controls. User input to the operation interface 26 (e.g., depression of a button) controls the operational direction of the motor 82. In other embodiments, the motor 82 may be a brushless DC motor and the control board 78 may set the operational direction of the motor 82. The motor 82 is coupled to the hydraulic drive assembly 86 by a motor shaft 94 to raise or lower the lift assembly 42. In the illustrated embodiment, the hydraulic jack 10 includes a transmission assembly 98 (e.g., a planetary gear assembly) that is supported in the housing 30 and that is coupled between the motor 82 and the hydraulic drive assembly 86 to transmit the rotational output of the motor 82 to the hydraulic drive assembly 86. The transmission assembly 98 may modify the speed of the rotational output of the motor 82 by a reduction ratio such that the rotational input received by the hydraulic drive assembly 86 is faster or slower than the rotational output received from the motor shaft 94. In some embodiments, the transmission assembly 98 may be omitted and the rotational output of the motor 82 may be provided to directly the hydraulic drive assembly 86.

Figure 6:
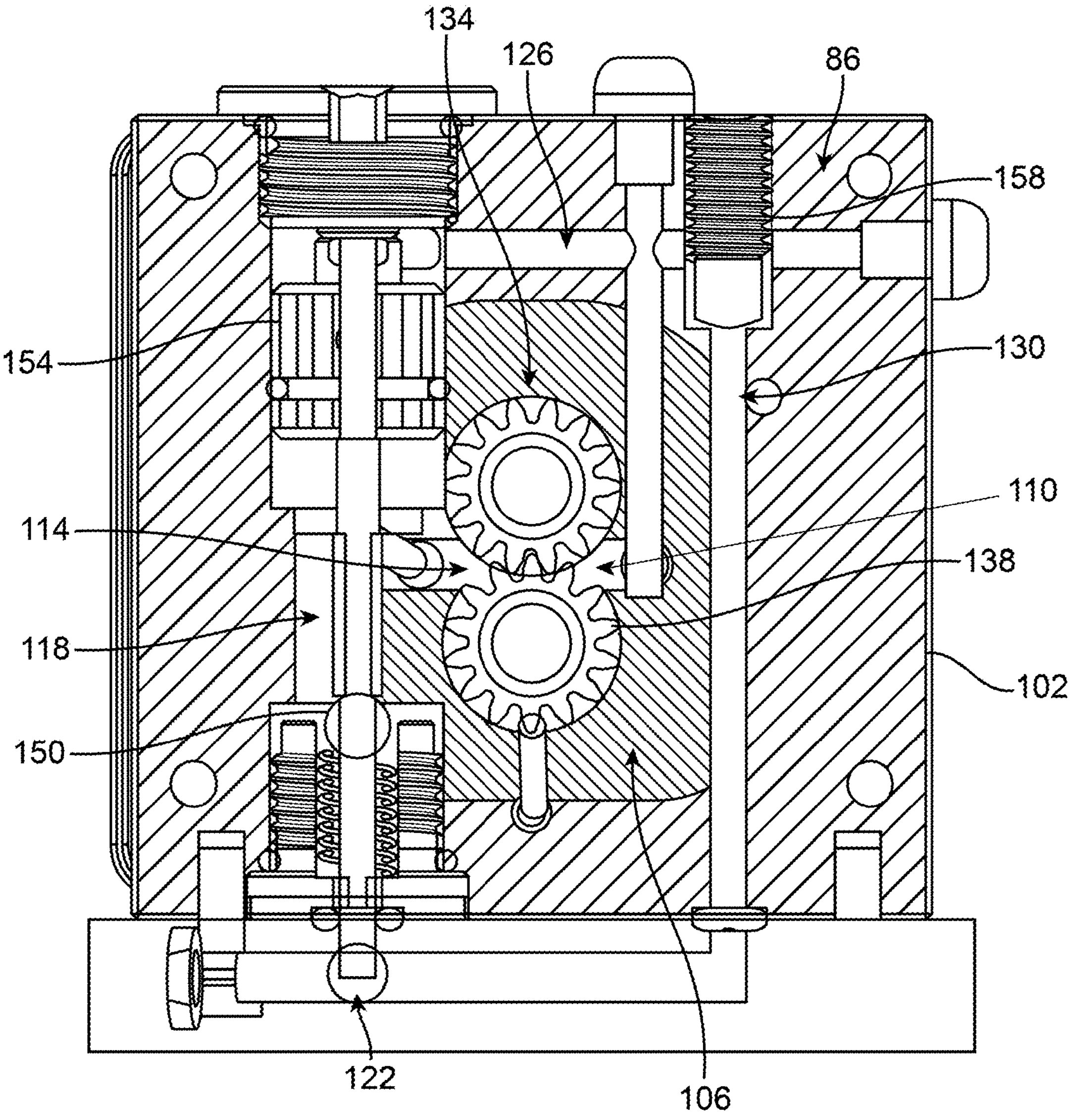
FIG. 6 is a section view of the hydraulic jack taken along line 5-5 in FIG. 4 and illustrating a portion of a hydraulic drive assembly.
Figure 7:
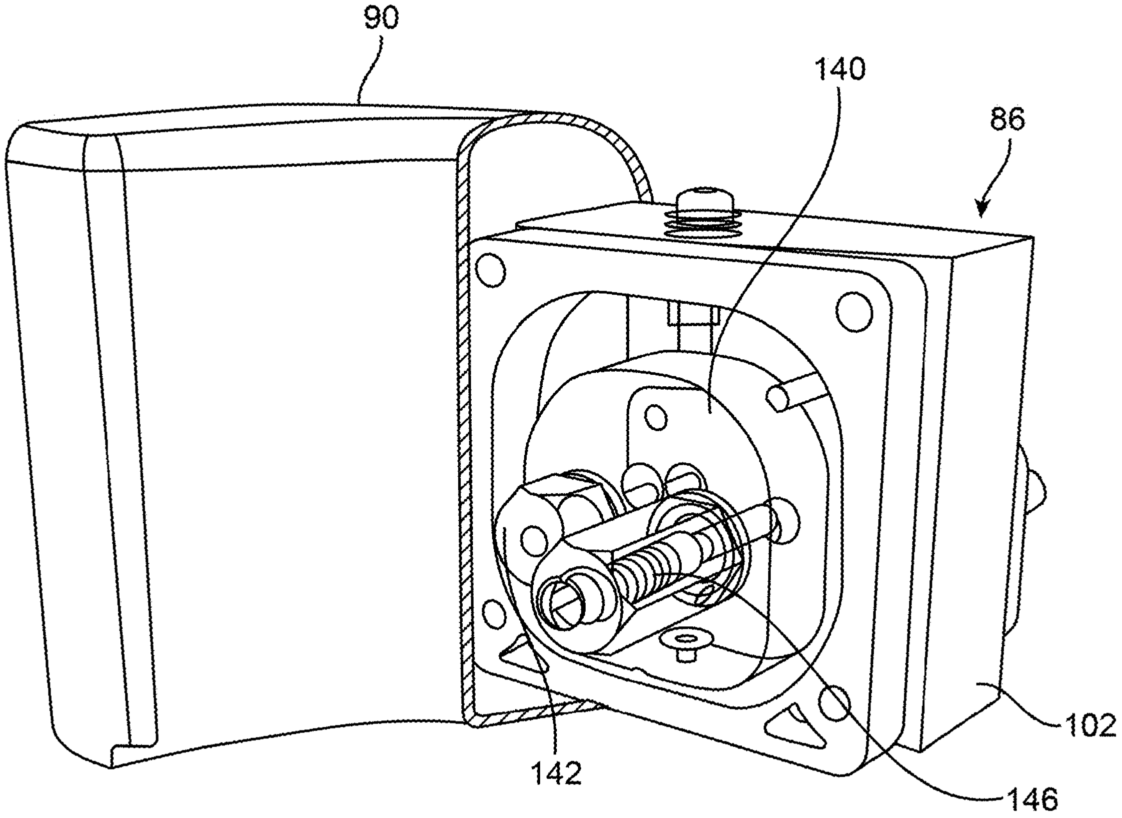
FIG. 7 is a perspective view of a portion of the hydraulic jack illustrating a reservoir, a manifold, and an outlet valve.

With reference to FIGS. 5-7, the hydraulic drive assembly 86 is fluidly coupled to the lift assembly 42 and the reservoir 90. The hydraulic drive assembly 86 includes a manifold body 102 in which a series of fluid channels 106 (e.g., a pump inlet 110, a pump outlet 114, an intermediate channel 118, a lift assembly channel 122, a return release channel 126, and a relief channel 130) are disposed and a pump assembly 134 coupled to the manifold body 102. The manifold body 102 may be coupled to a base 136 of the housing 30. The base 136 includes a metallic plate, which, it will be appreciated, provides stable support for the hydraulic jack 10 for safer operation of the hydraulic jack. One or more channels (e.g., lift assembly channel 122) may be disposed through the base 136 to the lift assembly 42. The pump assembly 134 receives the rotational output from the motor 82 and generates a flow of hydraulic fluid from the reservoir 90 to the lift assembly 42 to raise and lower the lift assembly 42 relative to the housing 30. The pump assembly 134 is at least partially supported within the reservoir 90. In the illustrated embodiment, the pump assembly 134 is a rotary positive displacement pump having external gears 138 rotatably supported within a pump body 140 to which a reservoir outlet valve 142 and reservoir inlet valve 146 are coupled. In some embodiments, the pump may be another type of pump. A return check valve 150, which is engageable by a plunger 154, is disposed in the fluid channels 106 to control the flow of hydraulic fluid to and from the reservoir 90. A relief valve 158 is supported in the relief channel 130 to allow hydraulic fluid to return from the lift assembly 42 to the reservoir 90 (e.g., in the event that the DC power supply 14 coupled to the hydraulic jack 10 lacks sufficient charge to operate the motor 82).

In some embodiments, the relief valve 158 is a fastener that is accessible through the port 71 in the housing 30 and is manually operable by the user (e.g., by unscrewing with the Allen wrench 72) to open the relief channel 130 to allow fluid to flow from the lift assembly 42 to the reservoir 90. In some embodiments, the relief valve 158 may be a manually depressible valve, a valve operated by the control 18, an automatic pressure relief valve configured to open when the pressure of the hydraulic fluid has exceeded a threshold, or another type of relief valve. It will be appreciated that the hydraulic jack 10 may have other drive assemblies to raise and lower the lift assembly 42.

The reservoir 90 is positioned in the lift portion 34 and at least partially surrounds the lift assembly 42 to maximize usage of the interior of the housing 30, which results in a compact footprint of the hydraulic jack 10. The reservoir 90 defines an interior volume in which hydraulic fluid may be stored.

The motor 82, the transmission assembly 98, and the hydraulic drive assembly 86 cooperate to generate and direct the flow of hydraulic fluid from the reservoir 90 to the lift assembly 42. The motor 82 may be activated to rotate the motor shaft 94 in a first direction to operate the transmission assembly 98 and the hydraulic drive assembly 86 (including the pump assembly 134). The pump assembly 134 generates a flow of hydraulic fluid from the reservoir 90, through the reservoir outlet valve 142 and the pump inlet 110, to the pump outlet 114 and the intermediate channel 118, and through the return check valve 150 to the lift assembly channel 122 and the lift assembly 42. To lower the vehicle or other object, the plunger 154 is engaged with the return check valve 150 by operation of the motor 82, and thereby the pump assembly 134, in an opposite second direction, which generates a flow of hydraulic fluid in the return release channel 126. This flow direction translates the plunger 154 to engage and open the return check valve 150. Gravity or continued operation of the motor 82, or both, may facilitate continued flow of hydraulic fluid through the return check valve 150, the intermediate channel 118, and the reservoir inlet valve 146 to the reservoir 90.

Figure 8:
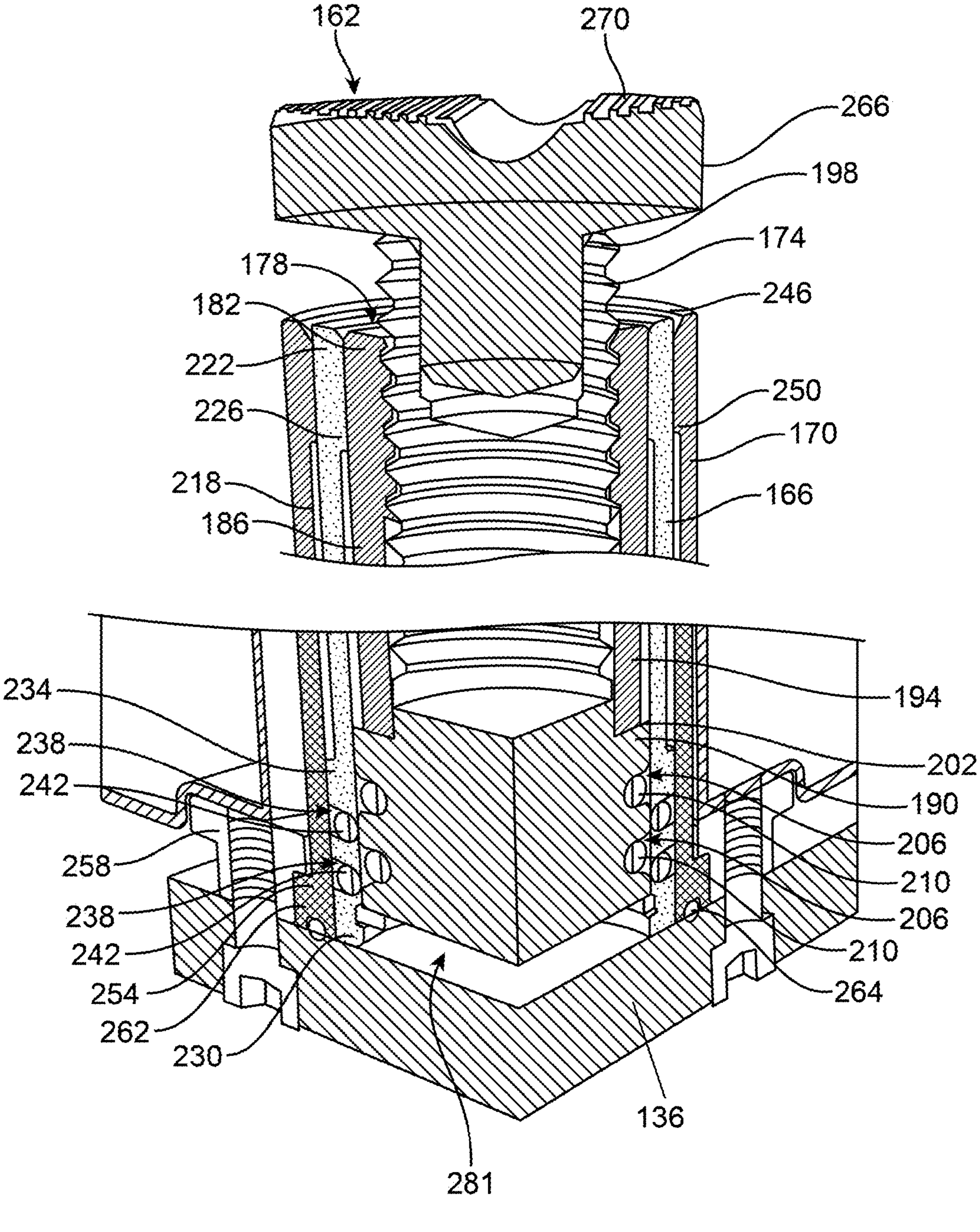
FIG. 8 is a section view of a portion of the hydraulic jack taken along line 7-7 in FIG. 4 and illustrating a portion of the lift assembly.
Figure 8A:
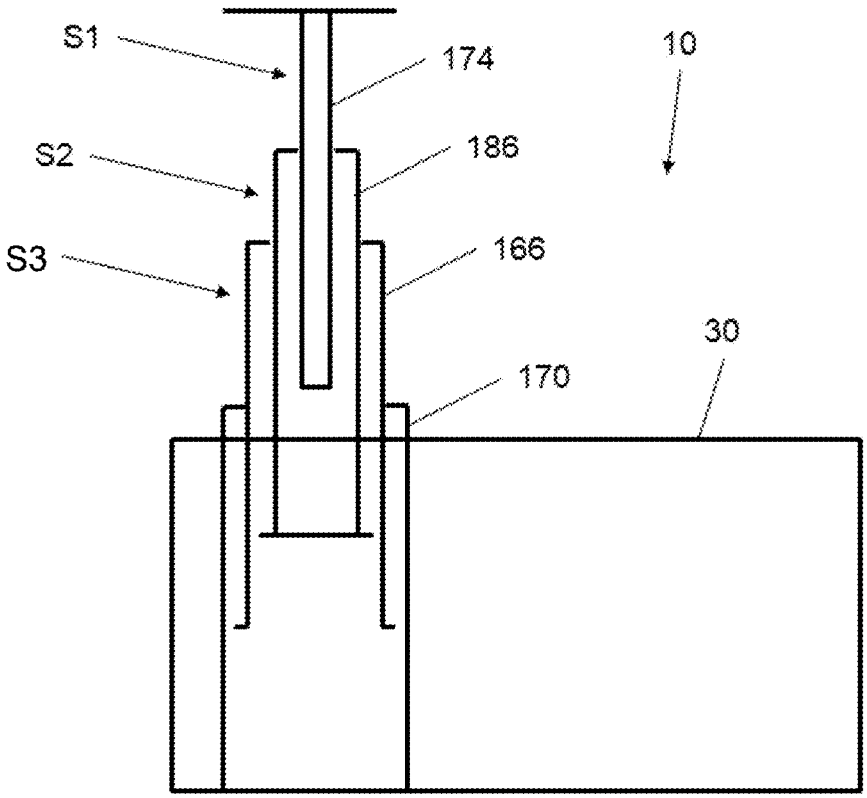
FIG. 8A is a schematic view of the hydraulic jack illustrating the stages of the lift assembly of the hydraulic jack.

With reference to FIGS. 5, 8, and 8A, the lift assembly 42 is at least partially disposed or supported in the lift portion 34 and extends upward from the housing 30 between a retracted position (e.g., a lowered position, shown in FIGS. 5 and 8) and an extended position (e.g., a raised position). The lift assembly 42 is illustrated as a three-stage telescoping piston lift assembly in which the first stage 51 is movable relative to the housing 30 in a manner different than the manner of movement for the second and third stages S2, S3 relative to the housing 30. The lift assembly 42 includes a piston 162 that is slidably supported in an intermediate sleeve 166, which is itself slidably supported in an outer sleeve 170. The piston 162, the intermediate sleeve 166 and the outer sleeve 170 at least partially extend beyond the housing 30 (e.g., above) when the lift assembly 42 is in a first, retracted position. In some embodiments, the piston 162, the intermediate sleeve 166, and the outer sleeve 170 are flush with the housing 30 in a retracted position.

The piston 162 includes a lift rod 174 that defines the first stage 51. The lift rod 174 has a threaded body that is received in a threaded bore 178 at the first end 182 of a first, inner sleeve 186 that defines the second stage S2. The lift rod 174 also has a stop 190 coupled to the second end 194 of the inner sleeve 186. The first end 198 of the lift rod 174 may be extended a variable length beyond the first end 182 of the first sleeve 186 in a first manner (e.g., by rotating the lift rod 174 relative to first sleeve 186 such that threaded engagement of the lift rod 174 and the first sleeve 186 extends or retracts the lift rod 174 relative to the first sleeve 186 (e.g., based on the direction of rotation). In the illustrated embodiment, the stop 190 is formed separately from the first sleeve 186 and coupled thereto (e.g., by press-fit, threaded connection, or other coupling manner). In other embodiments, the stop 190 and the first sleeve 186 may be integrally formed. The stop 190 defines an engagement portion 202 that extends radially outward beyond the outer diameter of the first sleeve 186. The stop 190 further defines seal grooves 206 extending circumferentially about the stop 190 and in which seals 210 (e.g., rubber O-rings) are disposed. The illustrated embodiment includes two seal grooves 206 and a seal 210 disposed in each seal groove 206. In other embodiments, the stop 190 may have one sealing groove and seal, or more than two sealing grooves and seals. The seals 210 contact the inner surface of the intermediate, second sleeve 166 to seal the space between the piston 162 and the second sleeve 166.

The intermediate, second sleeve 166 defines the third stage S3 and is slidably supported (e.g., movable in the second manner) within the bore 218 of the third, outer sleeve 170. The second sleeve 166 has a first end 222 that defines a first ridge 226 extending radially inward toward the piston 162 and a second end 230 with a second stop 234 extending radially outward. The second stop 234 is formed integrally (e.g., as one inseparable structure) with the second sleeve 166. The second stop 234 defines sealing grooves 238 extending circumferentially around the second stop 234, and seals 242 (e.g., rubber O-rings) are disposed in the grooves 238. The illustrated stop 234 includes two sealing grooves 238. In some embodiments, the second stop 234 may have fewer or more sealing grooves 238. The seals 242 contact the inner surface of the bore 218 of the third, outer sleeve 170.

The outer, third sleeve 170 has a first end 246 defining a second ridge 250 that extends radially inward toward the second sleeve 166. The opposite second end 254 of the third sleeve 170 is coupled to the housing 30 by an annular coupler plate 258 that is fastened to the housing 30. More specifically, a flange 262 that extends radially outward from the second end 254 of the third sleeve 170 is captured between the coupler plate 258 and the housing 30 (e.g., the base 136). A seal 264 is positioned between the third sleeve 170 and the housing 30 to seal the interface therebetween. In some embodiments, the third sleeve 170 may be coupled to the housing 30 in another manner (e.g., by welding, threaded connection, etc.). In other embodiments, the hydraulic jack 10 may include additional sleeves positioned concentrically surrounding the first, second, and third sleeves to further increase the extended length of the lift assembly 42 and, as a result, the height to which an object may be lifted.

With continued reference to FIGS. 5 and 8, the telescopic piston lift assembly 42 includes a saddle 266 that is removably coupled to the first end 198 of the lift rod 174 by a threaded connection. In other embodiments, the saddle 266 may be coupled to the piston 162 in another manner. The illustrated saddle 266 is circular with a diameter substantially equal to the diameter of the outer sleeve 170. The saddle 266 includes a surface 270 with texturing and grooves 274 that extend into the saddle 266 from the surface 270 and that define a cross pattern. Other embodiments of saddles 266*a*, 266*b*, 266*c*, 266*d* are shown in FIGS. 9A-9E. In a fully compressed, or retracted, position, the saddle 266 may be coupled to the lift rod 174 at a height of about 5.5 inches, 5.75 inches, or 6 inches away from a ground or support surface. In a fully extended position, the saddle 266 may be coupled to the lift rod 174 and provided at a height of about 16.5-18.5 inches above the ground or support surface That is, the hydraulic jack 10 may lift a vehicle or other object from about 6 inches to a lifted height of about 16.5-18.5 inches above the ground or support surface so that the frame or other structure of the vehicle or object is supported by saddle 266. Other dimensions will be contemplated by those having skill in the art.

In some embodiments, the saddle 266*a* may have a circular profile with a diameter that is greater than the diameter of the outer sleeve 170 and optionally with a different surface texture (e.g., without a groove). In other embodiments, the saddle 266*b* may include a single groove 274 extending across the diameter of the saddle 266*b*. In other embodiments, the saddle 266*c* may define a rectangular profile and include a V-shaped channel 278 extending across the saddle 266*c* to receive a protrusion, weld seam, or other structure of the object to be lifted. In other embodiments, the saddle 266*d* is a rectangular plate that may contain a groove 274 extending across the plate.

Figure 9C:
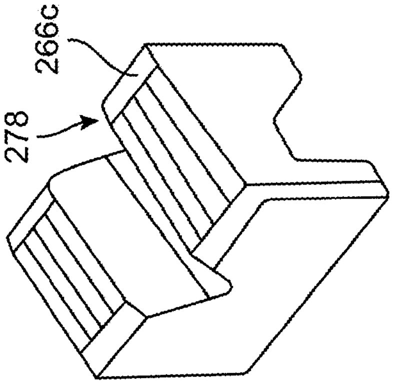
FIG. 9C is a perspective view of another embodiment of a saddle.
Figure 9B:
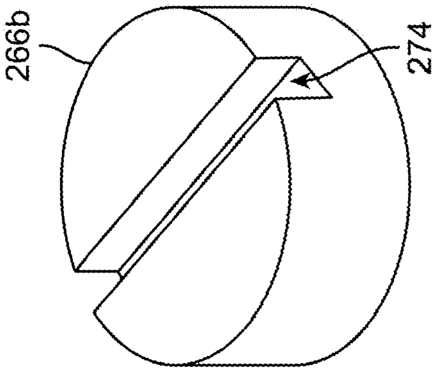
FIG. 9B is a perspective view of another embodiment of a saddle.
Figure 9D:
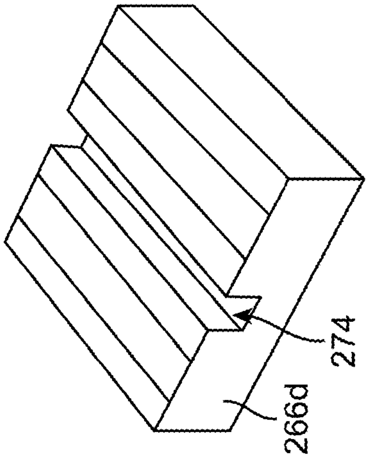
FIG. 9D is a perspective view of another embodiment of a saddle.
Figure 9A:
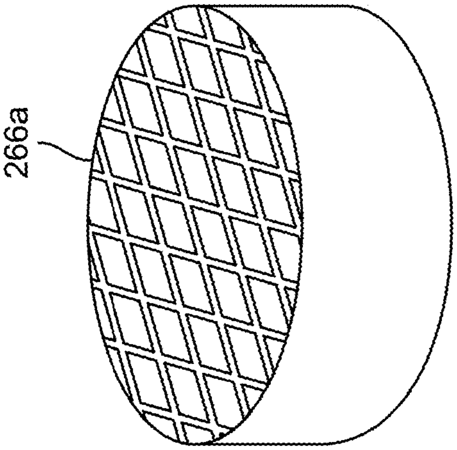
FIG. 9A is a perspective view of an embodiment of a saddle coupled to a piston of the lift assembly.
Figure 9E:
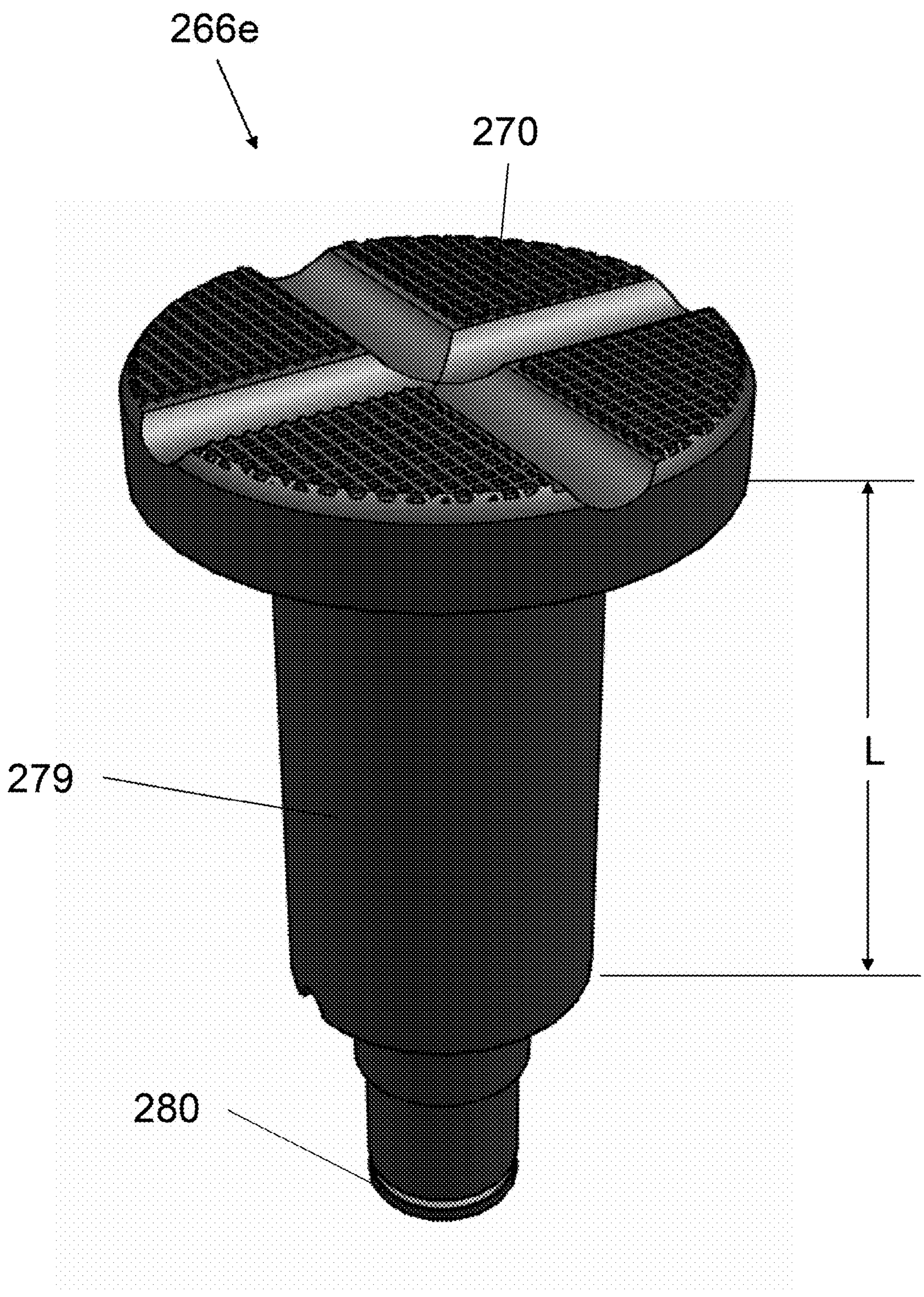
FIG. 9E is a perspective view of another embodiment of a saddle.

In some embodiments, for example as shown in FIG. 9E, an extension saddle 266*e* may be provided. The extension saddle 266*e* may be used in lieu of the previously described saddle 266. The extension saddle 266*e* may include an extension portion 279 that defines a length L. It will be appreciated that the distance the hydraulic jack 10 may lift an object is increased by the length L of the extension portion 279 of the saddle 266*e* when the saddle 266*e* is coupled to the lift rod 174 when compared to other saddles (e.g., saddle 266). Length L may be about 1 inch or greater than 1 inch. In some embodiments, length L is about 2 inches. Other lengths are contemplated. In his way, the vehicle or object may be lifted to a greater height than using the lift rod 174 and saddle 266 alone. For example, when extension saddle 266*e* is used, the hydraulic jack 10 may lift a vehicle or other object form about 8" to a lift height of about 18.5" above the ground or support surface so that the frame or other structure of the vehicle or object is supported by saddle 266. Other dimensions will be contemplated by those having skill in the art.

In some embodiments, the extension portion 279 may be formed as a separate piece that is couplable to the lift rod 174 between the lift rod 174 and another saddle (e.g., saddle 266). Other embodiments of saddles not illustrated may include different shapes, texturing, or structures. It will be appreciated that the embodiments of the described saddles 266, 266*a*, 266*b*, 266*c*, 266*d*, 266*e*, and other embodiments, are interchangeable such that the user of the hydraulic jack 10 may removably and interchangeably replace one saddle with another depending on various considerations (e.g., features of the object to be lifted (e.g., jacking location, weld seams, etc., wear on the saddle, jack height, etc.). The saddles and/or extensions portions thereof may include a terminal end 280 (e.g., a stemmed end) having one or more locking features (e.g., keys, tabs, or the like) that allow the saddles and/or extension portion to lock into the lifting rod 174, providing a secure connection to the hydraulic jack 10.

With reference to FIG. 8, the stop 190, the inner sleeve 186, the intermediate sleeve 166, and the outer sleeve 170 cooperatively define an interior compartment 281 within the intermediate and outer sleeves 166, 170 with a volume that is variable as the piston 162 is moved upward due to pressure imposed on the piston 162 by the hydraulic fluid when the hydraulic fluid is pumped into the interior compartment 281. The piston 162 and the intermediate sleeve 166 are translatable to the extended position (e.g., the position at which the first end 182 of the inner sleeve 186 and the first end 222 of the intermediate sleeve 166 are at positions furthest away from the housing 30). At the extended position, the engagement portion 202 of the stop 190 engages the first ridge 226 of the intermediate sleeve 166 and the second stop 234 engages the second ridge 250 of the outer sleeve 170.

The piston 162 may return to the retracted position by gravity alone or assisted by the weight of the object that has been lifted, or both. The piston 162 may instead return from the extended position to the retracted position by operation of the motor 82, which may facilitate removal of hydraulic fluid from the interior compartment 280.

Figure 10:
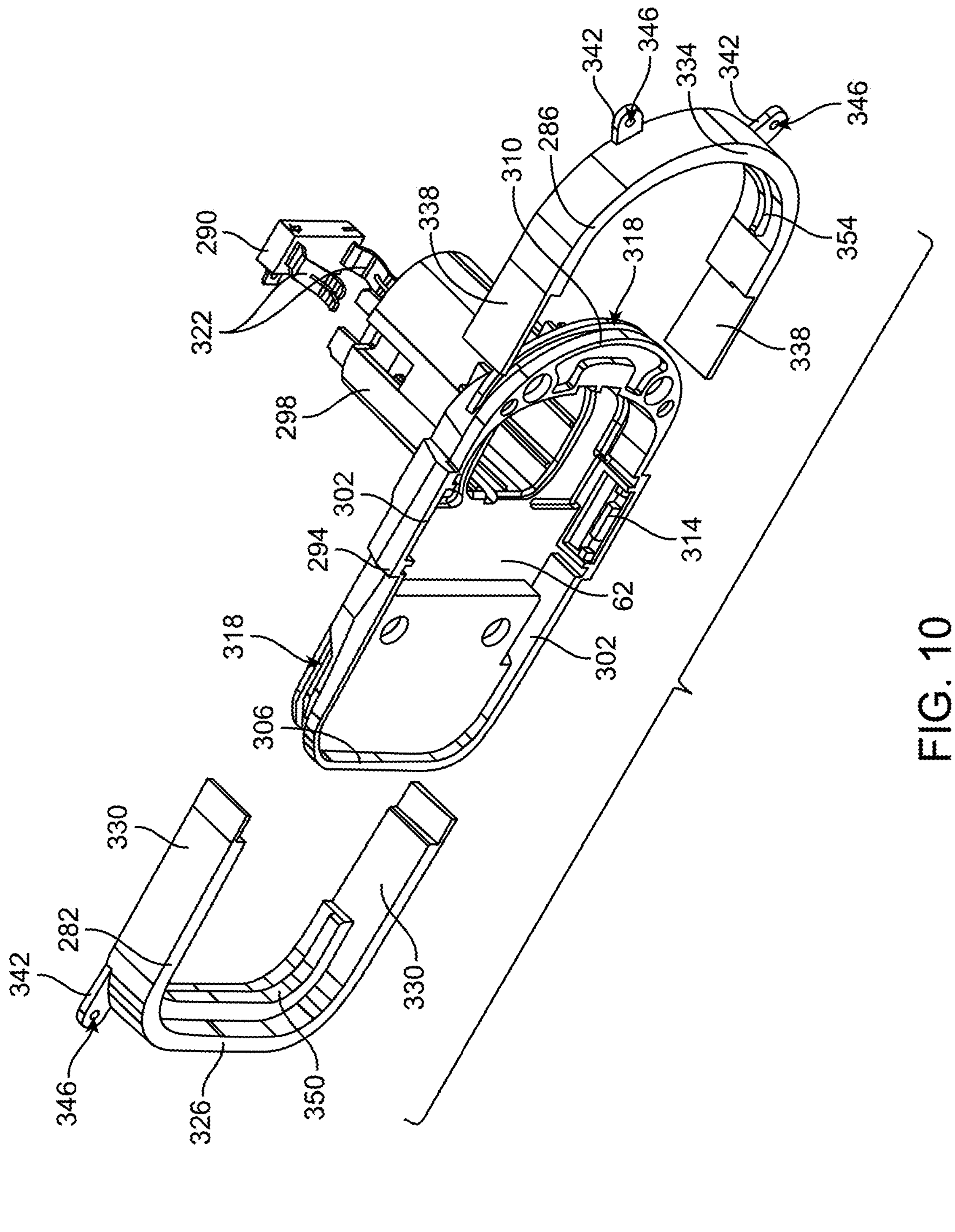
FIG. 10 is an exploded perspective view illustrating the power supply mount according to FIG. 1.
Figure 11:
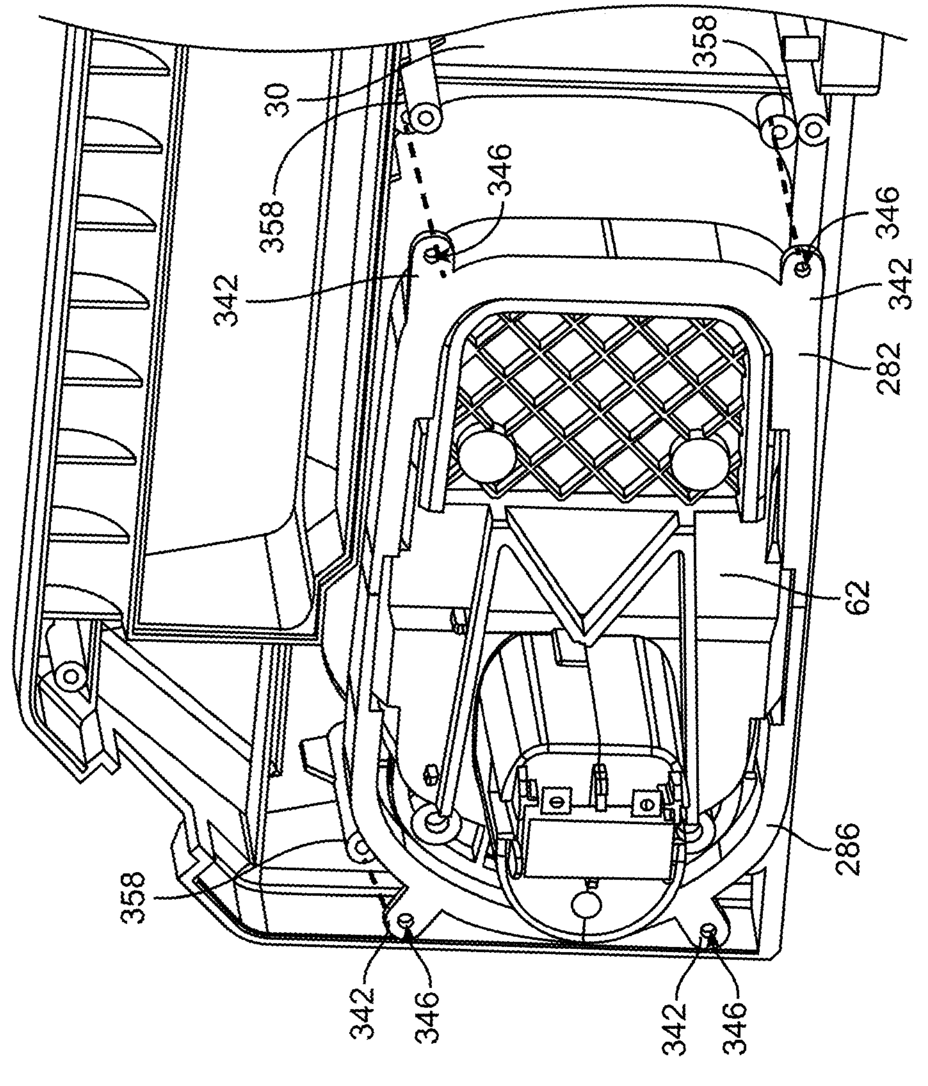
FIG. 11 is a perspective view of a portion of the hydraulic jack including the power supply mount.

With reference to FIGS. 10 and 11, the power supply mount 62 is coupled to the housing 30 by first and second support clamps 282, 286 that define a clamp assembly. The power supply mount 62 supports a terminal 290 that is electrically coupled to the control board 78. The power supply mount 62 includes a base portion 294 and a tower portion 298 that extends from the base portion 294. The base portion 294 defines a pair of substantially parallel edges 302 that are positioned on opposite sides of the tower portion 298. A substantially linear third edge 306 and a curved fourth edge 310 extend between the parallel edges 302, with the fourth edge 310 positioned closer to the tower portion 298 than the third edge 306. A pair of rails 314 (only one rail 314 shown, the other is the same or substantially the same) is positioned with one on each of the first and second parallel edges 302 and is engageable by latches of the DC power supply 14. Channels 318 extend into the base portion 294 along at least the third and fourth edges 306, 310, and at least part of the first and second edges 302. The terminal 290, which has a pair of metallic prongs 322, is coupled to an end of the tower portion 298 opposite the base portion 294. The prongs 322 extend into the hollow interior of the tower portion 298 to be engaged by the DC power supply 14.

The first and second support clamps 282, 286 are shaped to surround the base portion 294. That is, the first and second support clamps 282, 286 extend around the perimeter of the base portion 294. The first support clamp 282 includes a central portion 326 with extensions 330 that extend substantially perpendicular to the central portion 326. The second support clamp 286 includes a curved central portion 334 having a half-circular profile with extensions 338 extending from the central portion 334. Tabs 342 extend outwardly from the first and second support clamps 282, 286 and each tab 342 has a hole 346 through the tab 342. Ridges 350, 354 extend inwardly from the first and second support clamps 282, 286.

When assembled, as best shown in FIG. 11, the ridges 350, 354 of the first and second support clamps 282, 286 are received in the channels 318 to prevent movement of the power supply mount 62 relative to the first and second support clamps 282, 286. The power supply mount 62 and the first and second support clamps 282, 286 are attachable to the housing 30 via fasteners that are received in the holes 346 of the tabs 342 and that are then secured in bosses 358 extending from the housing 30. It will be appreciated that the power supply mount 62 and the first and second support clamps 282, 286 may be attached to the housing 30 in other ways.

Figure 12:
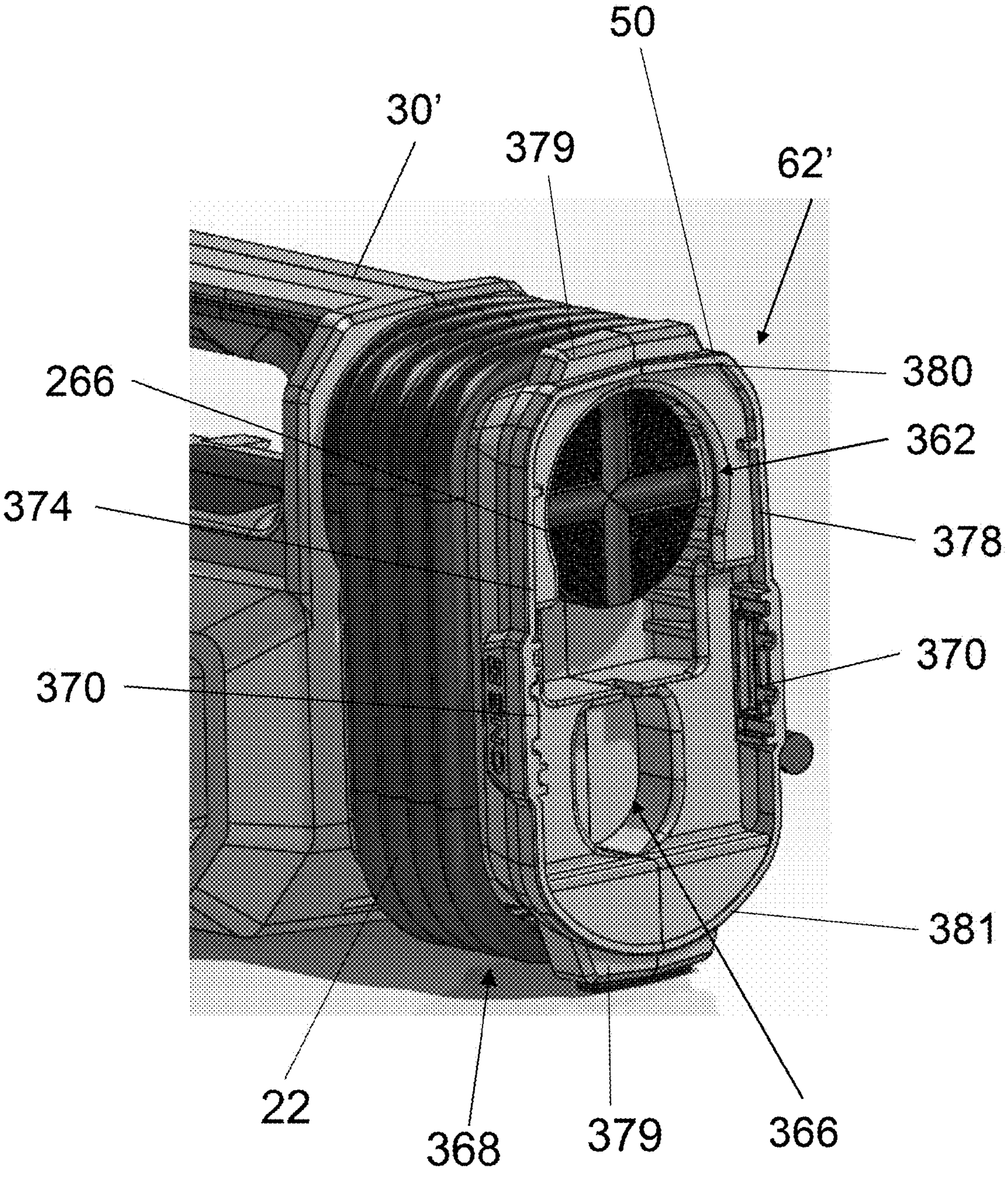
FIG. 12 is a perspective view of a portion of a hydraulic jack including a power supply mount.

With reference to FIG. 12, in another embodiment, the power supply mount 62' is formed integrally with the housing 30' (e.g. formed inseparably in the halves of the housing 30', with each half defining a portion of the power supply mount 62') at the second end 50 of the housing 30'. In some embodiments of the hydraulic jack 10, any of the saddles 266, **266*a*, 266*b*, 266*c*, 266*d*, 266*e* (saddle 266*e* shown) that are not coupled to the lift rod 174 may be supported in a recess 362 of the power supply mount 62' for storage when not in use. In this way, the saddles may be more efficiently stored and may be prevented from being lost while not in use. The power supply mount 62' defines a tower recess 366 that receives a portion of the DC power supply 14 (e.g. the tower portion of a tower-style battery pack). The power supply mount 62' defines an elongated portion 368, or cord storage portion, to receive both an extension portion 279 of a saddle (e.g., extension saddle 266*e*) and the tower portion of a DC power supply 14. The elongated portion 368 defines a depression extending about the perimeter of the housing 30' about and within which the cord 22 can be wound for storage. Rails 370 are positioned on opposite sides (e.g. the front side 374 and rear side 378) of the power supply mount 62'. The rails 370 are configured to engage latches or other coupling structures of a DC power supply 14. The power supply mount 62' may include additional structures of the power supply mount 62, including the terminal 290 (e.g. supported between halves of the housing 30') for electrically coupling the DC power supply 14 to the control board 78. Extrusions 379 extend from opposite sides (e.g., the top side 380 and bottom side 381) of the power supply mount 62' and are configured to maintain the cord 22 in a wrapped/wound state about the housing 30', without slipping off the second end 50. It will also be appreciated that the depression allows winding of the cord 22 such that the cord 22 is substantially flush with or within an envelope defined by the exterior of the housing 30'**.

The DC power supply 14 is attached to the power supply mount 62 to provide a DC power supply 14 for the hydraulic jack 10. By engaging the interface 26 of the control 18, power is provided to the motor 82 by the control board 78, which drives the hydraulic drive assembly 86 to raise or lower the piston 162. The DC power supply 14 also provide power to the light source 74 through the control board 78, and may be operated (e.g., turned off or on) depending on the inputs from the interface 26 of the control 18 and the power switch 70. It will be understood that the control 18 is a signal switch and sends a signal to control board 78 which in turn controls operation of the hydraulic jack by the firmware, described below. In other embodiments, the cord 22 is a current-carrying cord and power from the DC power supply 14 flows through the cord 22 to the motor 82 and operation of the hydraulic jack 10 is controlled by operation of the control 18.

FIG. 12 illustrates the electrical connection among the hardware of the hydraulic jack 10. For example, the hydraulic jack 10 includes a motor controller 382 and one or more sensors 386, 390 that are disposed on the control board 78 and that measure the condition of the hydraulic jack 10 and that output signals to the motor controller 382 indicative of the conditions of the hydraulic jack 10. In some embodiments, the motor controller 382 and sensor 394 may be located separately in the housing 30 (e.g., coupled to the motor 82, supported on additional printed circuit board assemblies within the housing 30, within the DC power supply 14, etc.). The motor controller 382 receives and outputs signals to and from hardware of the hydraulic jack 10, as will be described in further detail below.

In the illustrated embodiment, the sensor 386 is a power supply voltage sensor 386, the sensor 390 is a motor current sensor 390, and the sensor 394 is a temperature sensor 394. It will be appreciated that the jack 10 may include additional sensors. The power supply voltage sensor 386 measures the voltage supplied by the DC power supply 14 and outputs a voltage signal to the motor controller 382 indicative of the voltage of the DC power supply 14. The motor current sensor 390 measures the current drawn by the motor 82 and outputs a current signal to the motor controller 382 indicative of the current. The hydraulic jack 10 may also include a temperature sensor that monitors the temperature of the hydraulic jack 10 (e.g., the temperature of the motor 82, the pump assembly 134, the hydraulic fluid, etc.).

In the present embodiment, the hydraulic jack 10 also includes a metal oxide semiconductor field effect transistor 398 ("MOSFET") that is electrically coupled between the DC power supply 14 and the motor 82 and that drives operation of the motor 82 in response to signals from the motor controller 382. The motor controller 382 outputs a signal (e.g., a pulse width modulated signal) to the MOSFET 398 (e.g., in response to a user input signal received by the motor controller 382 from the control 18) to open the MOSFET 398 for current to flow from the DC power supply 14 to the motor 82, which activates the motor 82. The user input signal may be generated by a user input circuit 402 incorporated in the control 18. The signal may be generated in response to engagement of the interface 26. In the present embodiment, the temperature sensor 372 is coupled to and monitors the temperature of the MOSFET 398. The motor controller 382 also performs a protection operation in which the motor controller 382 turns the MOSFET 398 off in response to signals received by the motor controller 382 indicating that one or more conditions of the hydraulic jack 10 are outside a normal operating range (e.g., voltage from the DC power supply 14 is too low for continued operation, motor current is above or below a threshold for normal operation, temperature of the MOSFET 398 is too high, etc.).

Figure 13:
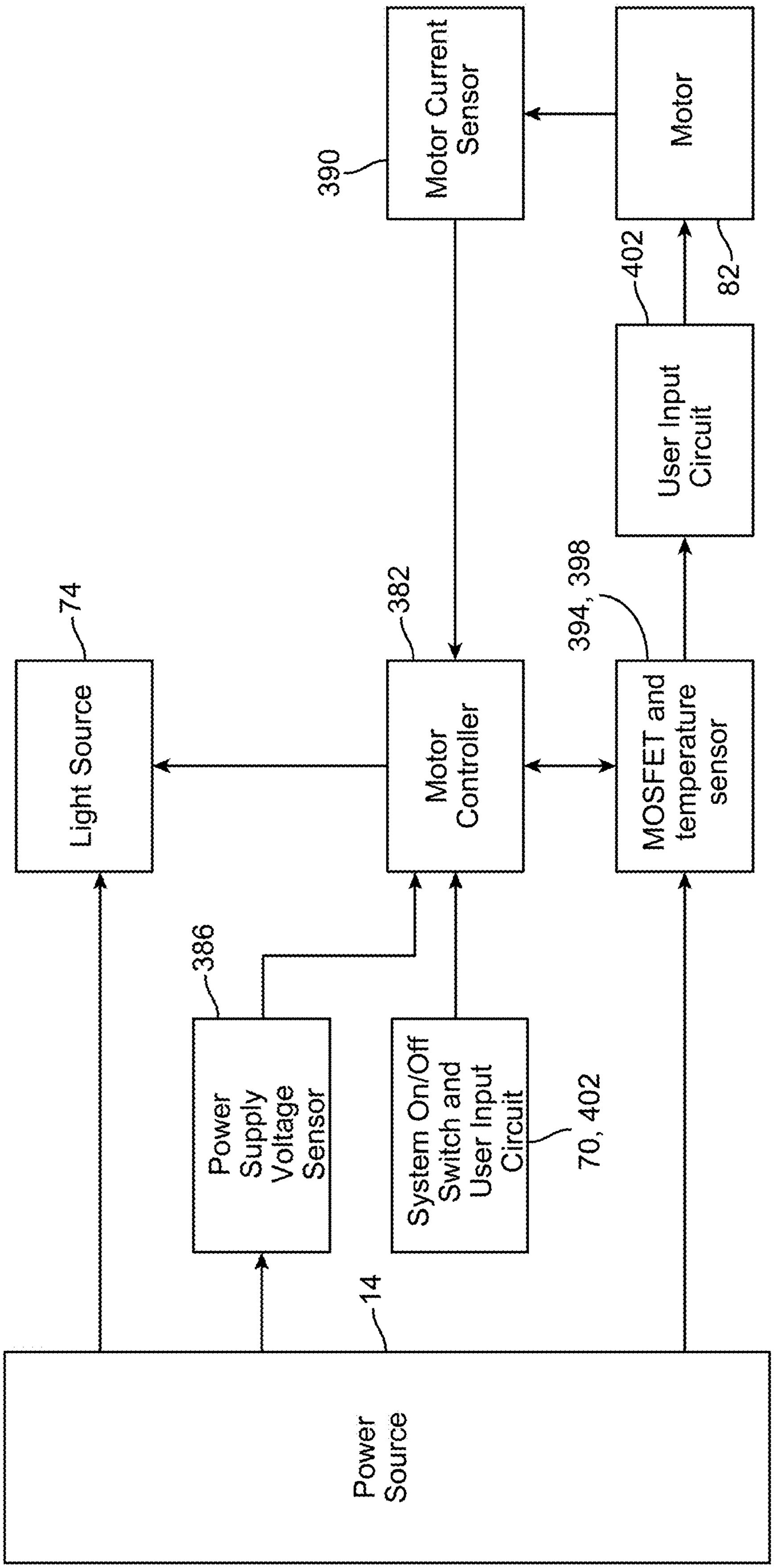
FIG. 13 is a diagram illustrating electrical components of the hydraulic jack.
Figure 14:
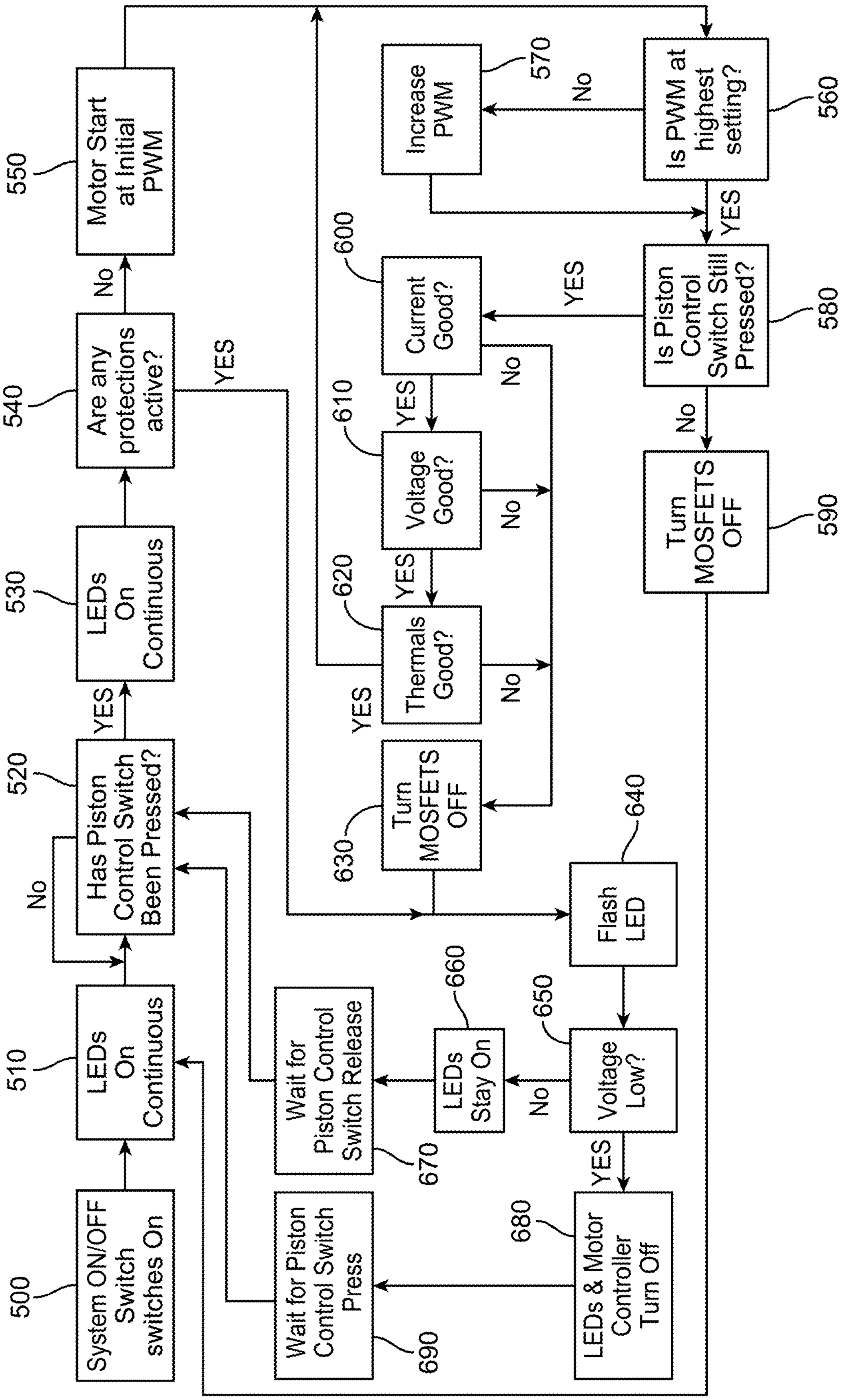
FIG. 14 is a schematic diagram illustrating operation and control of the hydraulic jack of FIG. 1.

The DC power supply 14 also provides an electrical power source for the light source 74, 74'. The light source 74 is operated (e.g., activated/deactivated) in response to a signal from the motor controller 382 (e.g., a flow of current to the light source 74, 74'). In the present embodiment, the motor controller 382 provides a signal to the light source 74, 74' in response to an input signal received from the control 18 while the power switch 70 is in the "ON" position. In some embodiments, the light source 74, 74' may be manually turned on and off. With reference to FIGS. 12 and 13, the motor controller 382 provides signals to the MOSFET 398 or the light source 74, 74', or both, in response to signals received from the power supply voltage sensor 386, the motor current sensor 390, temperature sensor 372, or any combination of the three sensors, or other sensors.

FIG. 13 illustrates the operation of the hydraulic jack 10 by the firmware steps (e.g., incorporated in the motor controller 382), which include tool protection and safety features as will be described. In a first step 500, the hydraulic jack 10 is turned on (e.g., by operation of a power switch 70 coupled to the housing 30). In the following step 510, operation of the power switch 70 allows current to flow from the power supply 14 to the light source 74 and the light source 74 is turned on in a continuous manner by motor controller 382. At step 520, the motor controller 382 determines whether a user input has been received (e.g., engagement/depression of the interface 26 by the user to raise or lower the lift assembly 42). If a user input has not been received, the motor controller 382 continues to monitor whether a user input has been received until a user input is provided. When a user input is provided via the control 18, a voltage potential is applied to the motor 82. The polarity of the voltage potential is either positive or negative depending on the direction the user has selected on the control 18 (e.g., a positive voltage potential is applied to the motor 82 to rotate the motor 82 in a first direction to extend the lift assembly 42 from the housing 30, and a negative voltage potential is applied to the motor 82 to rotate the motor 82 in an opposite second direction to retract the lift assembly 42). The user input circuit 402 senses whether a positive potential is applied to either pole of the motor 82 and provides a signal to the motor controller 382 indicating that a user input has been received.

At step 530, when a user input is received by the motor controller 382, the motor controller 382 continuously illuminates the light source 74. The motor controller 382 then determines in step 540 whether any protections (e.g., a current protection, voltage protection, temperature protection, etc.) are active. If no protections are active, the motor controller 382 activates the MOSFET 398 allowing current to the motor 82 at step 550, which commences operation of the motor 82. In the present embodiment, the motor controller 382 provides a pulse width modulated ("PWM") signal to the MOSFET 398 to control the rotational speed of the motor 82. The signal provided to the MOSFET 398 has a pulse width that is variable (e.g., modulated) between an initial pulse width setting and a maximum pulse width (i.e., the highest setting).

At step 560, the motor controller 382 continues to monitor operation of the hydraulic jack 10. At step 560, the motor controller 382 monitors the PWM signal and determines whether the PWM signal is at the highest setting. If the signal is not at the highest setting ("No" at step 560), the motor controller 382 increases the PWM signal to the MOSFET 398 in step 570. If the PWM signal is at the highest setting at step 560 ("Yes" at step 560), or after the PWM signal has been increased at step 570, the motor controller 382 determines whether the user is continuing to engage the interface 26 at step 580 (e.g., pressing the interface 26 to extend or retract the lift assembly 42). In the illustrated embodiment, if the user is not engaging the interface 26, power ceases to be supplied to the motor 82 and the motor controller 382 determines, based on a lack of signal from the user input circuit 402, that the user is not engaging the interface 26 ("No" at step 580). Thereafter, the motor controller 382 ceases to provide a signal to the MOSFET 398 at step 590, which turns off the MOSFET 398. The motor controller 382 then resumes at step 520 to monitor whether the user has provided a user input via the control 18.

If the motor controller 382 determines at step 580 that the user continues to engage the interface 26 and provide a user input signal to the motor controller 382 ("Yes" at step 580), the motor controller 382 begins a series of monitoring steps. For example, the motor controller 382 determines whether the motor current is within an acceptable range (step 600; e.g., by the motor current sensor 390), whether the power supply voltage is sufficient to continue operation (step 610; e.g., by the power supply voltage sensor 386), and whether the temperature of the MOSFET 398 is below a threshold (step 620; e.g., by a temperature sensor). If motor current, power supply voltage, and temperature are within their respective acceptable ranges, the motor controller 382 returns to step 560 to determine whether the PWM signal is at its highest setting (e.g., the motor 82 is operating at its fastest rotational speed). At step 630, if any of the motor current, power supply voltage, or temperature are outside of the acceptable range, the motor controller 382, in response to a signal received from one of the power supply voltage sensor 386, motor current sensor 390, or temperature sensor, turns off the MOSFET 398, which deactivates the motor 82.

After deactivation of the MOSFET 398, the motor controller 382 provides a signal to the light source 74 in a flashing manner at step 640. In the present embodiment, the number of times the light source 74 flashes is indicative of the cause of motor controller 382 deactivating the MOSFET 398 (e.g., two flashes for motor current exceeding a threshold, four flashes for power supply voltage out-of-range, six flashes for temperature out of range). The motor controller 382 then determines at step 650 whether the power supply voltage is low, e.g., below a threshold for continued operation. At step 650, if the voltage is at or above a threshold ("No" at step 650), at step 660, the motor controller 382 operates the light source 74 continuously. The motor controller 382 waits for the user to release the interface 26 at 670 and then returns to step 520 and monitors whether the interface 26 has been engaged. If the voltage at step 650 is below the threshold, ("Yes" at step 650), at step 680, the motor controller 382 deactivates the light source 74 to preserve power. Additionally, at step 680 power to the motor controller 382 is disabled, thereby deactivating the firmware until the power switch 70 is cycled off and then on (e.g., restarting the firmware steps at step 500) or the interface 26 is engaged (e.g., depressed) at step 690, returning to firmware step 510.

In any of the embodiments of the hydraulic jack described above, the hydraulic jack 10 may be capable of generating a lifting power, or raising, a vehicle or object having a weight of up to and including three tons. Any of the embodiments of the hydraulic jacks described above may be capable of holding a vehicle or object to be lifted having a weight of up to and including 4.5 tons.

Although the subject matter has been described in detail with reference to certain preferred embodiments, variations and modifications exist within the scope and spirit of one or more independent aspects of the subject matter as described.

The invention claimed is:

1. A hydraulic jack comprising:

a housing defined by sides and ends and including a lift portion and a power supply portion, the power supply portion configured to removably receive a power supply, the power supply portion including a power supply interface having a power supply mount configured to slidably receive the power supply on one of the sides of the housing;

a clamp at least partially surrounding the power supply mount and coupling the power supply mount to the housing;

a reservoir supported in the housing and configured to store hydraulic fluid;

a motor supported in the housing and configured to receive power from the power supply;

a pump assembly configured to receive a rotational output from the motor to generate a flow of hydraulic fluid from the reservoir; and a lift assembly at least partially supported in the lift portion and extendable between a retracted position and an extended position in response to the flow of hydraulic fluid, the lift assembly configured as a multi-stage lift assembly having a first stage and a second stage, and the first stage extendable from the second stage in a first manner.

2. The hydraulic jack of claim 1, wherein a lift rod defines the first stage, a first sleeve defines the second stage, and a second sleeve defines a third stage of the lift assembly and the second stage and the third stage are extendable in a second manner different from the first manner, wherein the lift rod is threadedly received in a first end of the first sleeve, wherein the first sleeve is slidably received in the second sleeve, and wherein the second sleeve is slidably received in a third sleeve coupled to the housing.

3. The hydraulic jack of claim 2, wherein a stop is disposed at a second end of the first sleeve, and wherein the stop has an engagement portion extending radially outward beyond the first sleeve, wherein the lift assembly further comprises a saddle couplable to a first end of the lift rod, and wherein the second sleeve defines a first end having a first ridge extending radially inward and configured to engage the engagement portion.

4. The hydraulic jack of claim 3, wherein the second sleeve has a second end defining a second stop extending radially outward, wherein the third sleeve defining a first end having a second ridge extending radially inward, and wherein the second ridge configured to engage the second stop.

5. The hydraulic jack of claim 3, wherein the saddle is replaceable by one or more different saddles.

6. The hydraulic jack of claim 3, wherein the saddle is threadedly coupled to the lift rod.

7. The hydraulic jack of claim 3, wherein the hydraulic jack is configured to lift an object to a lift height of about 16.5 inches.

8. The hydraulic jack of claim 3, wherein the hydraulic jack is configured to lift an object to a lift height of about 18.5 inches.

9. The hydraulic jack of claim 1, wherein the hydraulic jack defines a center of gravity between the lift portion and the power supply portion, wherein a handle extends from the housing, and wherein the center of gravity is positioned below the handle.

10. The hydraulic jack of claim 1, wherein the housing defines a recessed tray.

11. The hydraulic jack of claim 10, wherein the recessed tray is magnetic.

12. The hydraulic jack of claim 1, further comprising a control electrically coupled to the motor.

13. The hydraulic jack of claim 12, wherein the control is electrically coupled by a cord, wherein the housing defines a cord storage portion, and wherein the cord is windable about the cord storage portion.

14. The hydraulic jack of claim 13, wherein the cord has a length of about six feet.

15. The hydraulic jack of claim 1, wherein the housing is configured to store a wrench.

16. The hydraulic jack of claim 1, further comprising a ring-shaped light source supported by the housing and directed to illuminate the lift assembly.

17. The hydraulic jack of claim 1, wherein the lift assembly has a third stage and the second stage and the third stage are extendable in a second manner different from the first manner, and wherein the lift assembly further includes a saddle removably coupled to the first stage.

18. The hydraulic jack of claim 17, wherein the power supply mount has a recess extending about a perimeter of the power supply mount, wherein the clamp is at least partially disposed in the recess and is coupled to the housing, and wherein the power supply interface further includes a terminal coupled to the power supply mount, wherein the terminal engages the power supply.

19. The hydraulic jack of claim 18, wherein the clamp is a first support clamp of a clamp assembly, the clamp assembly further including a second support clamp.

20. The hydraulic jack of claim 17, wherein the power supply interface is disposed on a front side of the housing.

* * * * *